United States Patent [19]

Jensen

[11] Patent Number: 4,638,496

[45] Date of Patent: Jan. 20, 1987

[54] SECURE RELIABLE TRANSMITTING AND RECEIVING SYSTEM FOR TRANSFER OF DIGITAL DATA

[76] Inventor: Garold K. Jensen, 1024 Falcon Dr., River Falls, Wis. 54022

[21] Appl. No.: 723,316

[22] Filed: Apr. 15, 1985

Related U.S. Application Data

[62] Division of Ser. No. 347,952, Feb. 11, 1982, Pat. No. 4,536,747.

[51] Int. Cl.⁴ ........................................ H04B 1/10

[52] U.S. Cl. ........................................ 375/104; 375/58; 455/212; 455/222

[58] Field of Search .................. 375/51, 58, 104, 111, 375/113, 114, 117; 455/212, 222

[56] References Cited

U.S. PATENT DOCUMENTS

| | | | |
|---|---|---|---|
| 3,423,682 | 1/1969 | Cauchois | 375/104 |
| 3,564,419 | 2/1971 | Yackish | 455/212 |
| 3,651,263 | 3/1972 | Lindback et al. | 375/114 |
| 3,764,984 | 10/1973 | McCartney | 340/531 |
| 3,961,137 | 6/1976 | Hutt et al. | 375/117 |
| 3,978,479 | 8/1976 | Schmitz | 340/531 |
| 4,006,460 | 2/1977 | Hewitt et al. | 340/505 |
| 4,023,139 | 5/1977 | Samburg | 340/506 |
| 4,138,674 | 2/1979 | Humphries | 340/506 |
| 4,168,494 | 9/1979 | Hummel et al. | 340/531 |
| 4,203,096 | 5/1980 | Farley et al. | 340/538 |
| 4,204,201 | 5/1980 | Williams et al. | 340/517 |
| 4,254,410 | 3/1981 | Virkus | 340/506 |
| 4,257,038 | 3/1981 | Rounds et al. | 340/539 |
| 4,306,308 | 12/1981 | Nossen | 375/113 |
| 4,483,011 | 11/1984 | Brown | 375/114 |
| 4,536,747 | 8/1985 | Jensen | 340/502 |

FOREIGN PATENT DOCUMENTS

| | | | |
|---|---|---|---|
| 2076603 | 12/1981 | United Kingdom | 455/212 |

OTHER PUBLICATIONS

BSR Model X-10 Home Control System (by Garold K. Jensen).

LSI Circuit MM54240 (by Garold K. Jensen).

*Communication Systems* by Carlson, McGraw-Hill, 1975, pp. 5-7.

*Primary Examiner*—Robert L. Griffin

*Assistant Examiner*—Raymond C. Glenny

*Attorney, Agent, or Firm*—Merchant, Gould, Smith, Edell, Welter & Schmidt

[57] ABSTRACT

A communication system for providing reliable transfer of digital data in such system as a security system between source of data 214 and user 213, and between user 213 and end use of data 215. When the false alarm rate requirement of the security system is specified in less than one in ten years, this tight requirement must also apply to the communication link even though the RF transmission path might use the very noisy 60 Hz power line. Digital data signals are transmitted only when a detection is made at source of data 214 or when user 213 outputs an action command to end of use data 215. Thus the communication system must maintain the low false alarm rate under two conditions: (1) where no data signal but noise and interference is received over long periods of time, and (2) where a data signal pulse noise is received. Receiver 212s' ability to differentiate between valid data and noise is increased by incorporating the digital data into a composite signal having a number of different signal and timing elements before it is sent. The discriminating ability of receivers 212 is further increased by including cascaded multi-stage signal processing circuits which respond to each of the elements of the composite signal but not to noise. A further barrier to false responses is provided by digital data decoders 219 which include additional signal processing circuits to recognize and accept only the valid data when it is part of a composite signal having elements of a correct count, timing and order.

4 Claims, 25 Drawing Figures

SECURE RELIABLE TRANSMITTING AND RECEIVING SYSTEM FOR TRANSFER OF DIGITAL DATA

This is a division of application Ser. No. 347,952, filed Feb. 11, 1982 and now issued as U.S. Pat. No. 4,536,747 of Aug. 20, 1985. Application Ser. No. 720,581, filed Apr. 8, 1985, is also a division of U.S. Pat. No. 4,536,747 and was allowed on Jan. 22, 1986 and is now U.S. Pat. No. 4,602,246.

TECHNICAL FIELD

The present invention relates to the field of general purpose intruder-environmental hazard detection, control, and action systems. More particularly, the present invention relates to a programmable system which permits a user to preprogram and reprogram the system such that a coordinated set of actions are taken in response to varying isolated and multiple circumstances and hazards. An embodiment of the claimed invention is generally disclosed in FIGS. 16–24. The detailed written description of the claimed invention is entitled, SECURE RELIABLE DATA LINK.

BACKGROUND OF THE INVENTION

Security systems which provide signals from a plurality of remote sending units and decode the signals in order to produce an appropriate alarm are known in the art. In certain of the prior art systems, a plurality of remote sending units transmit coded intrusion and other emergency signals to a central station. The station decodes the received signals and produces an appropriate response. However, the prior art does not adequately provide an alarm system for detecting a particular sequence and/or combination of events and providing flexibility to allow for several levels of response. The detection criteria of prior art systems also do not adequately provide for operator modification so as to tailor system response in light of current system requirements.

Furthermore, prior systems do not display at a control console in an easy to interpret manner the status of all current and past sensor detections and actions taken in response thereto. The user therefore does not have a complete system status report readily available at a control console. This complete status report is much needed if the user is to determine the criteria for initiating various actions in real time during ongoing system operation.

Additionally, prior systems do not provide the operator with the overall ability to disable any and all sensors, cut off automatic operation of any and all action devices, and manually initiate any and all action devices in real time during system operation. Consequently, the operator does not have total control and complete freedom to configure the system either for immediate system operation or for automatic operation over an extended period of time when the user is not present or does not desire to initiate manual control.

Often times the user is at a remote location and would like to be able to obtain system status. General purpose systems which only provide the status at a central location are not satisfying this requirement.

Conservation of RF frequency spectrum should be a goal of all systems just as is conservation of other limited resources. Systems should attempt to utilize the fewest transmission frequencies, the narrowest signal band width, and the shortest transmission period.

Most importantly, the data link between elements of the system must not appreciably raise the false alarm rate or lower the detection rate. The most common cause of loss in false alarm and detection rate is high noise and interference levels on the transmission path for the RF carrier frequency between the various data link senders and receivers. Such a data link might utilize the 60 Hz power line distribution system at the site where the data link is implemented. When no data is being sent and high noise and interference exist, the data link must suppress the passing or generation of spurious or false data. When data is being sent and noise and interference levels exist, the data link must preserve to the fullest extent possible the data message content without alteration.

A general purpose system is probably most needed during powerline outages. Thus, the data link must be capable of normal operation on batteries and without the 60 Hz powerline frequency for data synchronization purposes between transmitters and receivers.

The usefulness of a system is enhanced if the location and type of the remote sensor detections can be made known to a central location and if action commands from the central location can be directed at selected addressable receiver locations. This can be accomplished by digitally encoding the data link transmission with a suitably long digital address and command word. The digital word should be sufficiently long to prevent interference between a number of intruder alarm systems installed in the same neighborhood. Furthermore, to give the user unlimited full flexibility, each sender, receiver and central station where the processing of data is performed should have a built-in means to key any one of the total number of addresses permitted by the address word.

It is desirable that some systems utilize intruder detection sensors capable of detecting intruders before an entry is forced through a door, window etc. In such detectors which utilize frequency change detection mechanisms, it is necessary to overcome the tendency of the oscillator frequency to drift and the natural tendency of the least significant digits of a frequency counter to oscillate in order to insure an extremely low false alarm rate while maintaining a high detection rate.

These and numerous other problems which have not been satisfactorily solved by the prior art security systems are solved by the present invention.

SUMMARY OF THE INVENTION

The present invention relates to a comprehensive alarm system for modernity and plurality of locations equipped with sensors. The alarm systems includes means for transporting signals indicative of predetermined sensed conditions at the plurality of the mode locations. The alarm system further includes control means connected to receive the transmitted signals, the control means including program logic means for providing predetermined control signals in response to predetermined combinations and sequences of signals from the plurality of the mode locations. The alarm system also includes means for selectively reprogramming the logic means during system operations.

The present invention is relatively easy to use and adaptable to many different environments. All elements of the present invention are plugable into a conventional wiring system in a home or elsewhere. No special tools are required and therefore the owner/user can do his own installation without incurring service charges.

The alarm system of the present invention while being straight forward and uncomplicated to use, places the owner/user in full control of the system. In addition, the present invention has been kept relatively simple in both electronics and operating control so that the owner/user has the least possible learning burden placed upon him. The present invention amongst other reasons accomplishes this by avoiding computers and their associated complexity.

Because of its straight forward design and adaptation to existing power systems, the present invention will last many years without attention except for batteries which are utilized as a backup source of power.

The system of the present invention monitors and controls the outputs of multiple sensors located throughout the system. All current sensor detections are indicated at a control console. In addition, all previous detections are held and also indicated. This gives the owner/user complete information as to the current and past data of the various sensors. The current and past status of all actions are likewise indicated. This enables the owner/user to determine what actions, if any, have taken place.

The control console provides a choice of many actions, either automatically or manually, thereby allowing for varying levels of response. The system provides for and facilitates the manual and automatic selection of the criteria for initiating many of the actions. This enables setting the requirement that one or more sensor detections must be made before a given action will be initiated. A combination or sequence of sensor detections may therefore be required. Certain actions may be initiated by a switch selection of sensor detections which can be varied. By requiring more than one sensor detection for any particular action, the false alarm may be decreased because it is most unlikely that two or more sensors would false alarm at the same time.

Switches are provided at the control console permitting the owner/user to cut off any or all sensor outputs and allowing manual operation of any of the actions. In addition, switches are provided at the control console allowing the user to switch on or off automatic operation of any or all actions.

A further advantage of the present invention is that status of the various detections and actions can be obtained via telephone. Status information is presented at a remote telephone as a series of audio tones having varying frequency and duration with the frequency indicating the category of the detection and actions and the duration indicating whether the detections or actions have occurred.

The present invention provides a digital data link means for conveying information between a remote sending device and a central station or data processing unit and from the central station to a remote receiving device via an RF carrier frequency. Furthermore, the present invention provides a digital coding means which will permit identification, at a central station, of the source of the message from a number of possible sources and will permit the sending of a digital message to any one of a number of remote receiving stations.

The design philosophy of the present invention is such that no transmission exists until a detection is made. At the control console, if the detection made meets the detection criteria a corresponding action command is then transmitted to an action receiver and thence to an action device. The transmission medium, an RF path or the 60-hertz power system wiring, and the frequency spectrum are occupied only briefly and only in a narrow extent of the frequency band. A primary important reason for this arrangement is to aid in achieving an extremely low false alarm rate as well as to reduce use of the transmission spectrum. In a noisy transmission path, the more frequently signals are transmitted the higher probability of a false alarm.

Since only a few, if any, signals will be processed by the control console in a year's time, straightforward digital logic is capable of providing the required signal processing. Thus the present invention does away with the necessity for a microcomputer. Often times security systems are designed around the characteristics of a computer and not around the needs of the system. When a computer is utilized, it is necessary to keep it busy in order to justify the cost. Thus, frequently the computer is put to work sampling or interrogating the sensors repeatedly over short periods so as not to miss too many detections. With a noisy transmission medium, the probability of a false alarm with the computer system will be much higher than the subject system. Also, the transmission medium will be continuously occupied reducing available spectrum.

Furthermore, as well as having an exceedingly low false alarm rate, a security system must have a very high detection rate. With a computer in the system, the detection rate will be degraded because computers are not operational 100% of the time.

The digital data link means of the present invention utilizes a method for synchronizing the data link receiver decoder to the data link sender. Thereby providing a means for synchronization when on battery power. The method utilized is the forming of a signal group consisting of a predetermined number of cycles of sender clock frequency placed at the front of the digital code word address. The sender clock frequency is utilized to synchronize a phase lock loop clock generator which in turn provides a synchronized clock signal to synchronously step the serial data bits into a shift register.

In addition, the synchronizing signal group greatly enhances the ability of the data link receiver squelch means to totally differentiate between desired signals and noise. It is absolutely necessary that when a desired signal is not being received by the data link receiver, that noise be blocked from reaching the decoders in order to insure a very low false alarm rate. When a signal is being received, noise is suppressed by FM receiver limiter action.

The present invention utilizes sensors installed inside a structure which are capable of detecting intruders outside the structure before they open a door or window. These sensors comprise field effect sensors which change their frequency upon detection of the presence of a person. The sensors are relatively small and can be placed near doors or windows without obstructing the use thereof. In addition, the short wire antenna can be shaped to fit about any dimensions of an opening or space. No alignment or adjustment of the sensors is required at installation.

A frequency change detector is utilized to detect the change in frequency while overcoming many of the problems associated with digital frequency counters. The frequency change detector will tolerate slow drift in the carrier frequency and will supress false alarms due to random noise in the system.

These and various other advantages and features of novelty which characterize the invention are pointed out with particularity in the claims annexed hereto and forming a part hereof. However, for a better understanding of the invention, its advantages, and objects obtained by its use, reference should be had to the drawings which form a further part hereof, and to the accompanying descriptive matter, in which there is illustrated and described a preferred embodiment of the invention.

BRIEF DESCRIPTION OF THE DRAWINGS

In the drawings, in which like reference numerals and letters indicate corresponding parts throughout the several views.

DETAILED DESCRIPTION OF THE INVENTION

Figure 1:
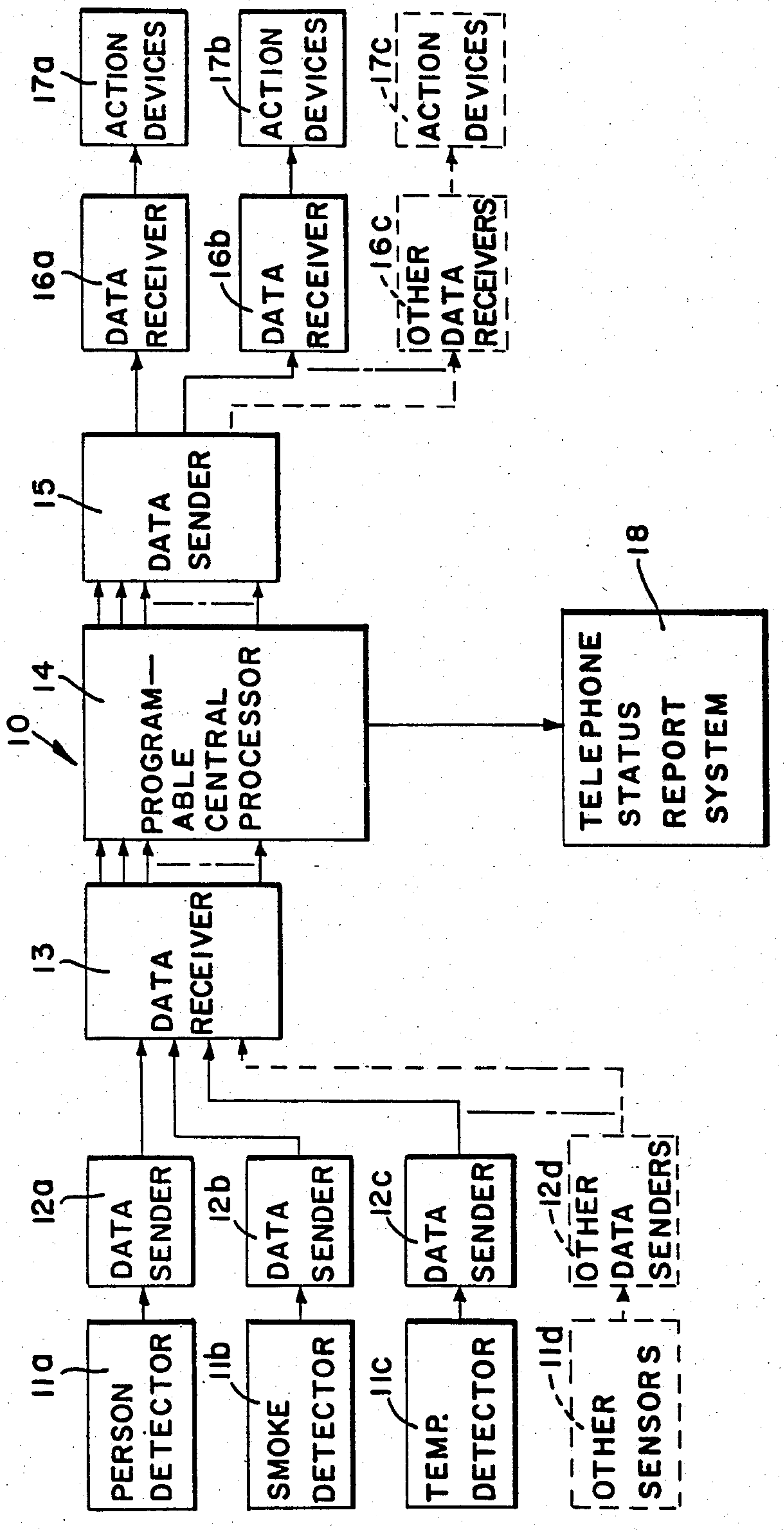
FIG. 1 is a block diagram of an alarm system using the present invention.

FIG. 1 shows a block diagram of a preferred embodiment of the comprehensive intruder-environmental hazard detection, control, and action system, generally designated as 10, of the present invention. System 10 of the present invention includes a plurality of detectors or sensors 11 such as person detector 11*a*, smoke detector 11*b*, temperature detector 11*c*, and various other miscellaneous sensors and detectors, designated generally as 11*d*. Detectors 11 in such a system may be utilized to detect the presence of intruders and various environmental conditions such as the presence of smoke or fire, high or low temperatures, fuel supply, gas fumes, running water, lights on or off, etc. Detectors 11 illustrated in FIG. 1 are merely a sample of some of the many detectors and sensors that might be utilized in system 10 of the present invention.

Most likely, more than one person detector 11*a* would be utilized in system 10 of the present invention if system 10 were implemented in a midsize home or business building. In addition, multiple smoke detectors 11*b*, temperature detectors 11*c* and multiple detectors and sensors of other types would likely be utilized in the normal family home or business setting.

Data from the remotely located detectors or sensors 11 is transmitted by data link senders or transmitters 12 using a common carrier frequency to a data link receiver 13. Data link senders 12 and receiver 13 are described hereafter in a description of the secure reliable data link utilized by the present invention. The present invention has a very low false alarm rate even when using the rather noisy transmission medium of existing house or business wiring. In addition, the transmissions are encoded so that the source and destination of all data is known. This further enhances the capabilities and usefulness of system 10. Note that there may be any number of data senders 12 as generally indicated by 12*d*.

Data link receiver 13 transmits data to a programmable central data processor 14. Programmable data processer 14 determines the action to be taken in response to the data received from multiple detectors and sensors 11 and the sequence in which it is received. Programmable central data processer 14 sends commands via data sender 15 using a common carrier frequency to multiple data receivers 16 which transmit the commands to various action devices 17. Action devices 17 might be such items as lights, horns or buzzers for generating internal noise or external noise, telephone dialing systems for dialing oneself at work or office, the neighbors, the police, the fire department, medical help, etc. There may be any number of data receivers 16 and action devices 17 as is generally indicated by 16*c* and 17*c* respectively.

Figure 6:
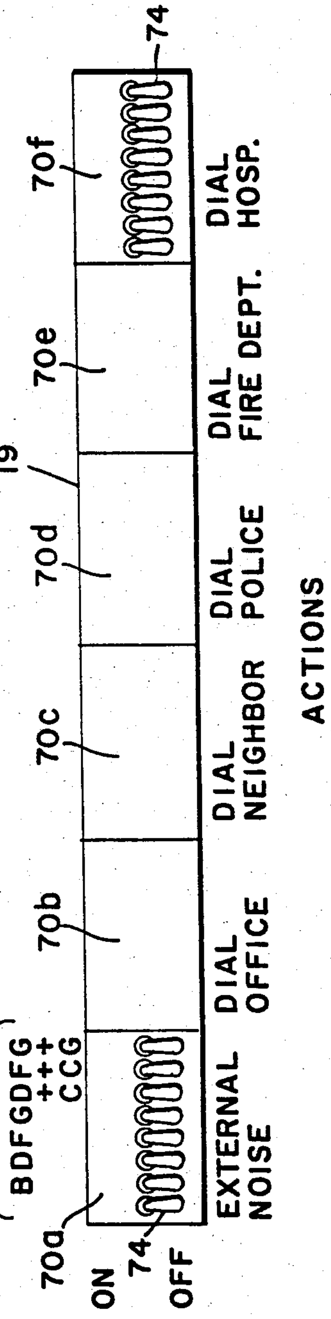
FIG. 6 is a drawing of a portion of the front panel of the control console diagrammatically showing some of the DIP switches for selecting varying levels of responses.
Figure 5:
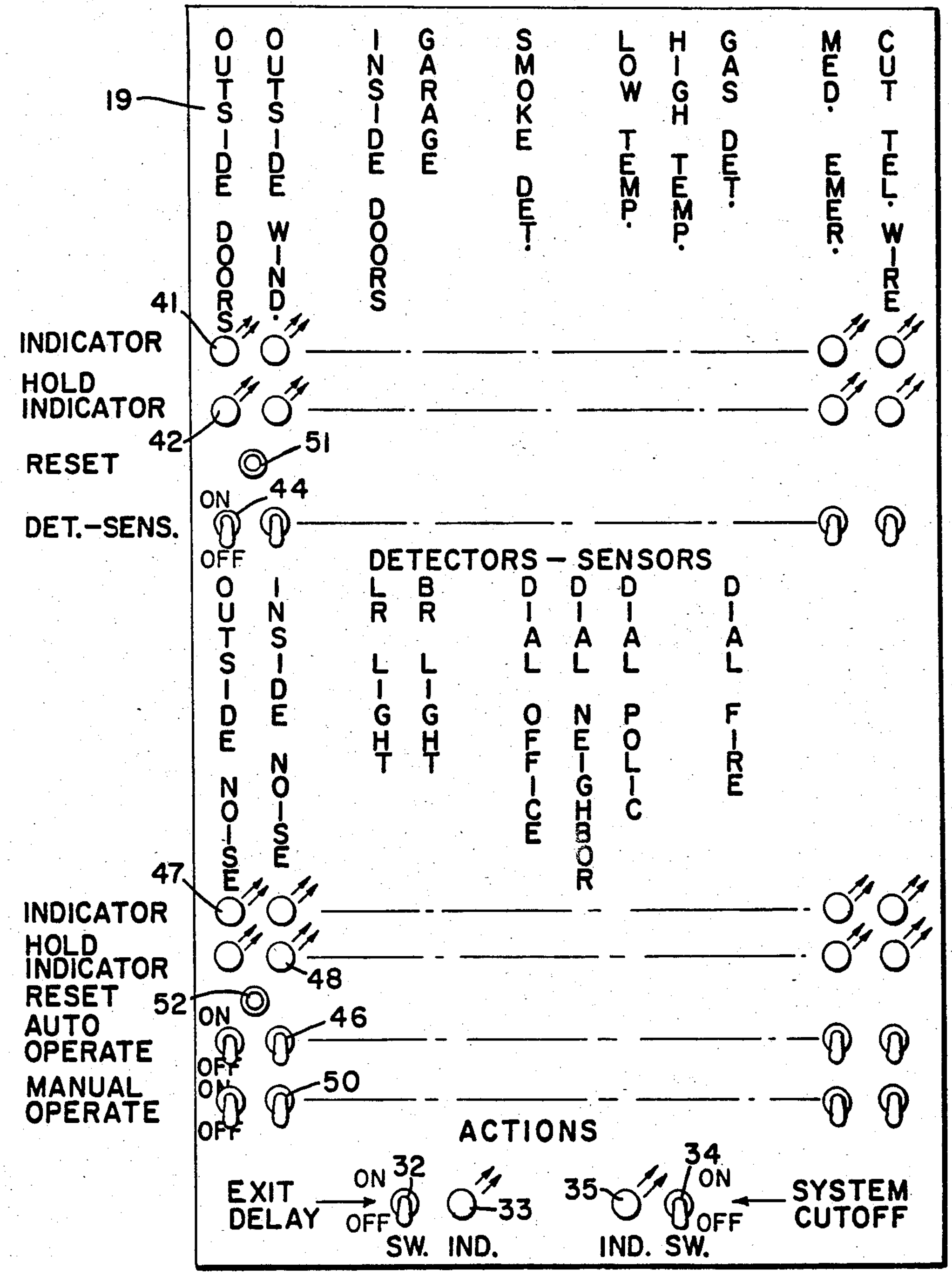
FIG. 5 is an illustration of portion of the front panel of a control console showing the sensor and action indicaters and associated switches.

Programmable central data processer 14 maintains the status of present and past detector and sensor 11 outputs as well as present and past actions taken by action devices 17. This status is provided via suitable indicators located on the front panel of an operator control console 19, an embodiment of which is illustrated in FIGS. 5 and 6. This information can also be most interesting and useful to the user of system 10 while away during the day at work, on a trip, etc. The user can obtain quick access to this status information from a remote telephone site via a telephone status report system 18. The owner or user can simply call in and give a correct enabling code whereupon all of the status data for the various sensor outputs and past actions taken will be given over the telephone.

Table 1 below provides a sample list of various detectors and sensors 11 which might be utilized in an embodiment of system 10 and lists the various locations where the detectors and sensors 11 might be located. The following list is provided by way of illustration only as there could obviously be many different varying types of sensors 11 utilized in other applications in many different settings or locations.

TABLE 1

| DETECTOR OR SENSOR | LOCATION |
|---|---|
| 1. Person detector | South bedroom window |
| 2. " | Living room window |
| 3. " | Dining room window |
| 4. " | Family room window |
| 5. " | Utility room window |
| 6. " | Recreation room window |
| 7. " | Recreation room window |
| 8. " | Work room window |
| 9. " | Front door |
| 10. " | Dining room door |
| 11. " | Family room door |
| 12. " | Garage door |
| 13. " | Family room hallway doorway |
| 14. " | Living room-dining room doorway |
| 15. " | Bedroom-hallway doorway |
| 16. " | Basement stairway doorway |
| 17. Front door bell | Front Door |
| 18. Fire detector #1 | Basement |
| 19. Fire detector #2 | First floor |
| 20. Fire detector #3 | Second floor |
| 21. High temperature | Second floor |
| 22. Low temperature | Basement |
| 23. Gas | Gas supply line |
| 24. Running water | Water meter |
| 25. Cut telephone wire | Telephone system |
| 26. Medical emergency | Bedroom |
| 27. Power outage | Power supply |
| 28. Remote voice, data, digital communications | Kitchen |
| 29. Remote control of lights, appliances, etc. | Kitchen |
| 30. Exit delay | Control console, front door |

Table 2 is provided to give a detailed illustrative list of actions that may be taken automatically or manually by system 10 utilizing the various sensor inputs listed in table 1. Once again, this is provided for illustrative purposes only and should not be construed to any way limit the scope or application of the present invention. Also included in table 2 are the detector and sensor inputs from table 1 and inputs from various logic circuits of programmable central data processor 14 hereafter described. The logic circuitry of programmable central data processor 14 initiates predetermined action sequences or combinations of actions in response to various sequences or combinations of sensor inputs.

TABLE 2

| ACTIONS | INPUTS |
|---|---|
| 1. Control console buzzer | Logic A |
| 2. South bedroom light | #1 |
| 3. Living room light | #2, 3, 9, and 10 "OR gated" |
| 4. Family room light | #4, and 11 "OR gated" |
| 5. Utility room light | #5 |
| 6. Recreation room light | #6 and 7 "OR gated" |
| 7. Work room light | #7 and 8 "OR gated" |
| 8. Garage light | #12 |
| 9. Internal noise | Logic B, D, F, G, D + C F + C and G + C |
| 10. External noise | Logic same as 9 |
| 11. Dial police | Logic same as 9 |
| 12. Dial office or work | Logic D and E "OR gated" |
| 13. Dial selected number | Logic same as 12 |
| 14. Dial neighbor | Logic same as 12 |
| 15. Dial friend | Logic same as 12 |
| 16. Dial fire department | Logic H |
| 17. Dial heating and plumbing | #21, 22, and 23 "OR gated" |
| 18. Medical help | #26 |
| 19. Call neighbor via carrier frequency | Logic D and E "OR gated" |
| 20. Remote control of power outlets | #29 |
| 21. Call - in status report | Read out held at input and action indicators |
| 23. Front door bell cut off action #4 | #17 |
| 24. Exit delay (cut actions 60 sec.) | #30 |

Figure 2:
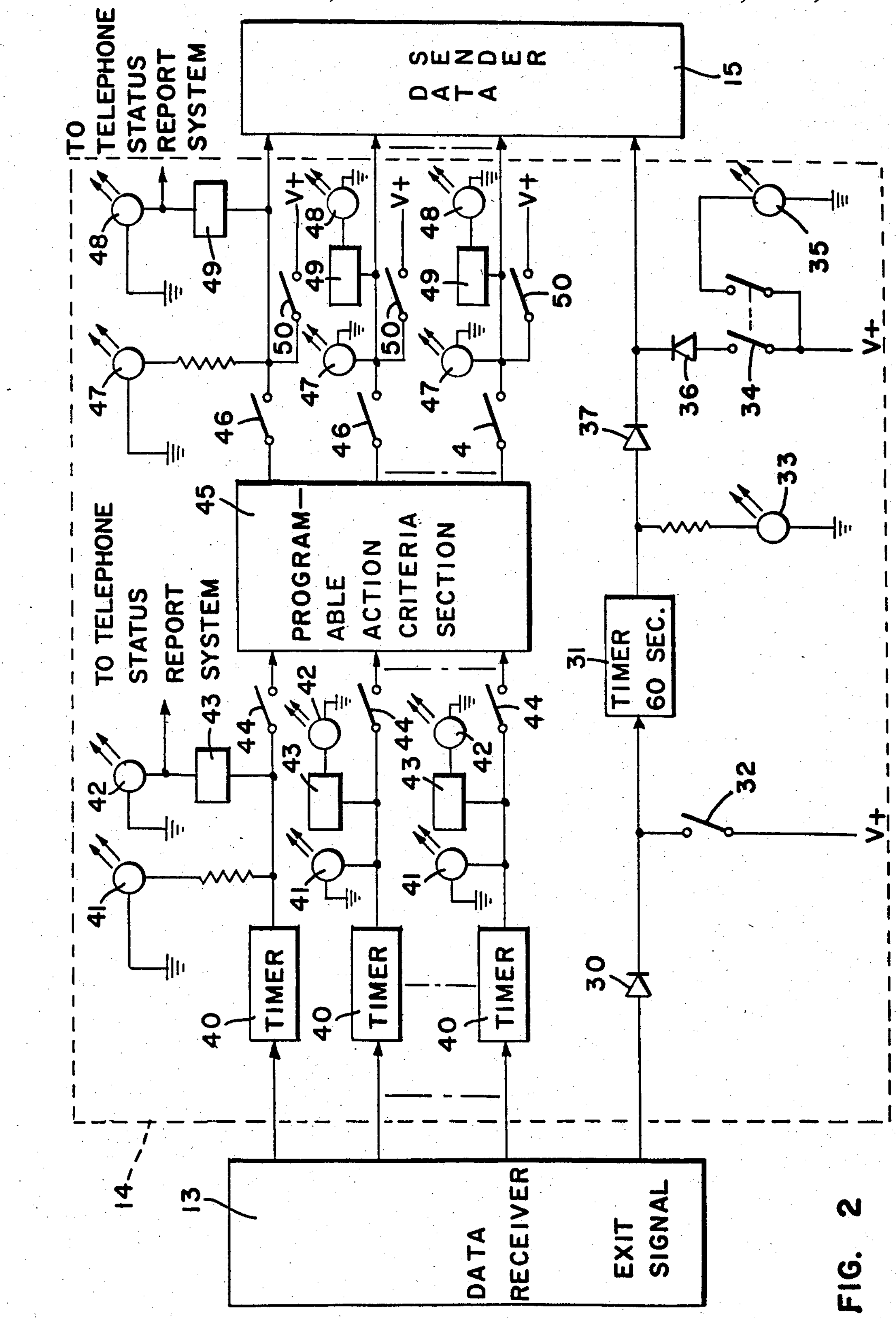
FIG. 2 is a schematic block diagram showing the typical data flow path through the programmable central data processor.

FIG. 2 is a partial schematic of the data processor 14 illustrating the signal flow from data receiver 13 to data sender 15. The data signal inputs are obtained from the various detectors and sensors 11 via data link receiver 13.

As illustrated in Table 1, one embodiment of the present invention might utilize exit delay signals. The data signal input which corresponds to the exit delay signal in table 1 is received via data link receiver 13 and may pass through an isolating diode 30 so as to activate a timer 31. Timer 31 can also be activated or tripped at control console 19 by an exit delay switch 32 illustrated in FIG. 5. Diode 30 serves to isolate exit delay switch 32 from receiver 13. Once timer 31 is tripped, an exit delay indicator 33 on control console 19 will light and the exit delay signal is transmitted to data link sender 15 whereby all action devices will be disabled for a period of time determined by timer 31. Note that in the embodiment shown, a 60 second timer 31 is utilized. However, for other applications, it may be desirable to utilize a timer having other values. The exit delay signal enables a person to exit from the building without setting off any action devices 17. Note that the exit delay signal can be activated either at control console 19 via exit delay switch 32 or at a remote location. For example, the exit delay signal might be activated by the insertion of a key into the lock of a remote sender.

System 10 might also make use of entrance delay signals which would function very similarly to the exit delay signal. Thus, a person could enter a building without activating any of the action devices.

As shown in FIG. 5 and illustrated schematically in FIG. 2, a manual system cutoff switch 34 located on operator control console 19 will allow the operator to cut off or disable all actions by sending a disable signal to data sender 15. All action devices 17 will be disabled until system cutoff switch 34 on operator console 19 is switched off and data sender 15 is enabled. System cutoff indicator 35 on operator console 19 will light when all actions are cut off thereby serving as a warning that system 10 is disabled. Diodes 36 and 37 are suitably located in the circuitry to prevent interaction of system cutoff switch 34 and timer 31.

In the embodiment shown, the other various sensor and detector 11 inputs listed in Table 1, other than the remote communications and remote control inputs, might each trigger a separate timer 40 after being received from data receiver 13. Each timer 40 may be set to remain on for a predetermined fixed period of time. An example of this might be 10 minutes for person detector inputs thirteen to sixteen in Table 1. Each timer 40 has two corresponding indicators 41 and 42 which appear on the front panel of control console 19 as illustrated in FIG. 5. When timer 40 is on, indicator 41 lights so as to indicate which detector or sensor 11 has originated an input signal within the time period of timer 40. The activation of timer 40 also sets a hold circuit 43, such as a flip-flop, which causes hold indicator 42 to light. Hold indicator 42 will remain lit until manually reset at operator console 19 by reset button 51. Thus, after a particular timer 40 has been deactivated, hold indicator 42 for the particular timer 40 will continue to reveal which detector or sensor 11 at some previous time had sent an input signal. Thus the operator by looking at operator console 19 will know when an input signal from a sensor 11 is received and which sensors 11 have previously sent input signals to programmable central data processor 14. It should be noted that the inputs from the sensors need not trigger a timer and that any combination of timers with inputs might be used.

The output signal of each timer 40 may be sent through separate switches 44 to a programmable action criteria section 45 of programmable central data processor 14. Switches 44 are sensor and detector 11 on/off switches positioned on operator console 19 as illustrated in FIG. 5. In programmable action criteria section 45 inputs from data receiver 13 are grouped in various combinations and sent through its various logic circuits, monitoring individual inputs from receiver 13 or combinations thereof to verify if the criteria for actuating various action devices 17 have been met. Sensor on/off switches 44 allow inputs into section 45 to be cuf off or disabled. Switches 44 thus enable or disable inputs from the particular sensors 11 to which they are connected via data receiver 13.

As shown in FIG. 2, output signals from criteria section 45 are fed through a switch 46 to an action indicator 47 and a hold circuit 49 with an associated action hold indicator 48. There may be a separate switch 46 for each section 45 output or two or more outputs may be ganged and sent through a single switch. Switches 46 allow the outputs of action criteria 45 to be cut off, which disables the response of action devices 17 to inputs from receiver 13. Switches 46 are located on operator control console 19. Action indicators 47 indicate which action devices are currently in operation and hold indicators 48 indicate which action devices 17 have previously been in operation. Timers may be utilized in a similar manner to timers 40 to retain action criteria 45 outputs. After being activated hold indicator 48 remains lit until reset by the operator pressing the associated reset button 52 on operator console 19.

As shown in FIG. 5 and illustrated schematically in FIG. 2, a switch 50 positioned at operator console 19 functions as a manual operation switch for manually activating action devices 17. There may be a separate switch 50 for each section 45 output or action device 17. Thus, the operator can at any time activate any action device 17 as desired. It should be noted that the various indicators and switches described above may be present for each particular sensor 11 or action device 17 or they may be grouped according to various combinations thereof.

Figure 3:
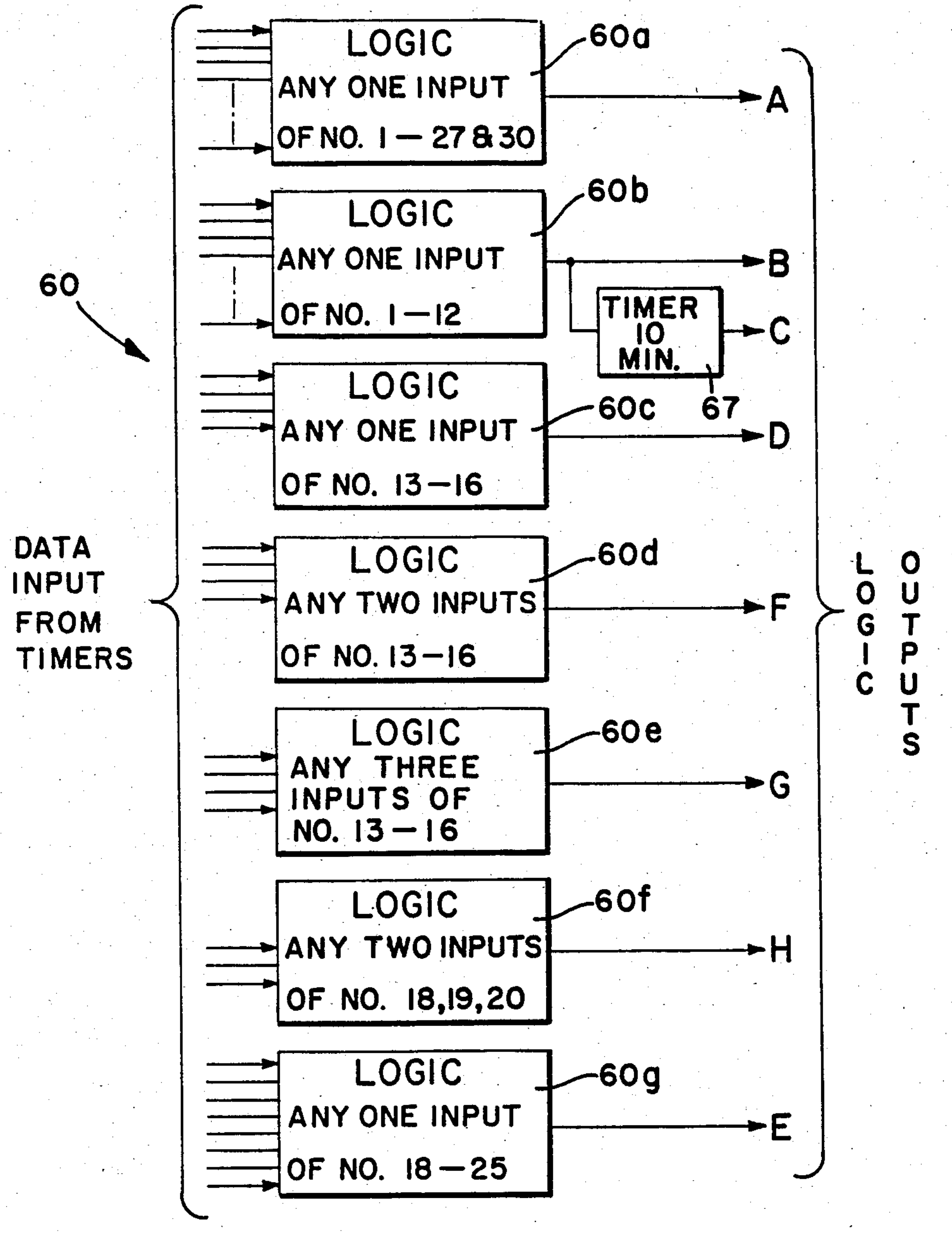
FIG. 3 is a block diagram of one embodiment showing the logic which establishes the various levels of response to the sensor input.

FIG. 3 is a block diagram illustrating some examples of the logic circuitry that might be found in programmable action criteria section 45. Each set of logic circuitry is illustrated as being connected to various groupings of timer 40 outputs which are obtained from data receiver 13 outputs. Logic circuitry *60a* in this particular example is shown as being wired to accept input data from timers 40, each timer corresponding to a particular detector or sensor 11, which are numbered one through twenty-seven and thirty in table 1. Whenever any one or more of these inputs are delivered through logic circuitry *60a*, logic circuitry *60a* will provide an output labeled A. Similarly, logic circuits *60b* through *60g* in this illustration will generate outputs B through H for various inputs and combinations thereof. These outputs may be connected to switches 46 as illustrated in FIG. 2. Note that logic circuitry *60b* provides an output if an input originating in any one of detectors and sensors 11 numbered one through twelve in table 1 is detected. This logic output is labeled as B. However, a second timed output labeled C may be generated by connecting a timer 67 to provide another timed logic output labeled C, as mentioned above. In this particular example, a ten minute logic output is being provided. The time period of output B depends on timers 40 and the logic. Note that in the embodiment of the invention shown, the programmable action criteria section 45 will contain other logic circuitry to generate the various actions as indicated in table 2. It should be noted that the above examples of logic circuitry has been provided for illustration only and should not be construed as limiting the logic circuitry of the present invention.

Figure 4:
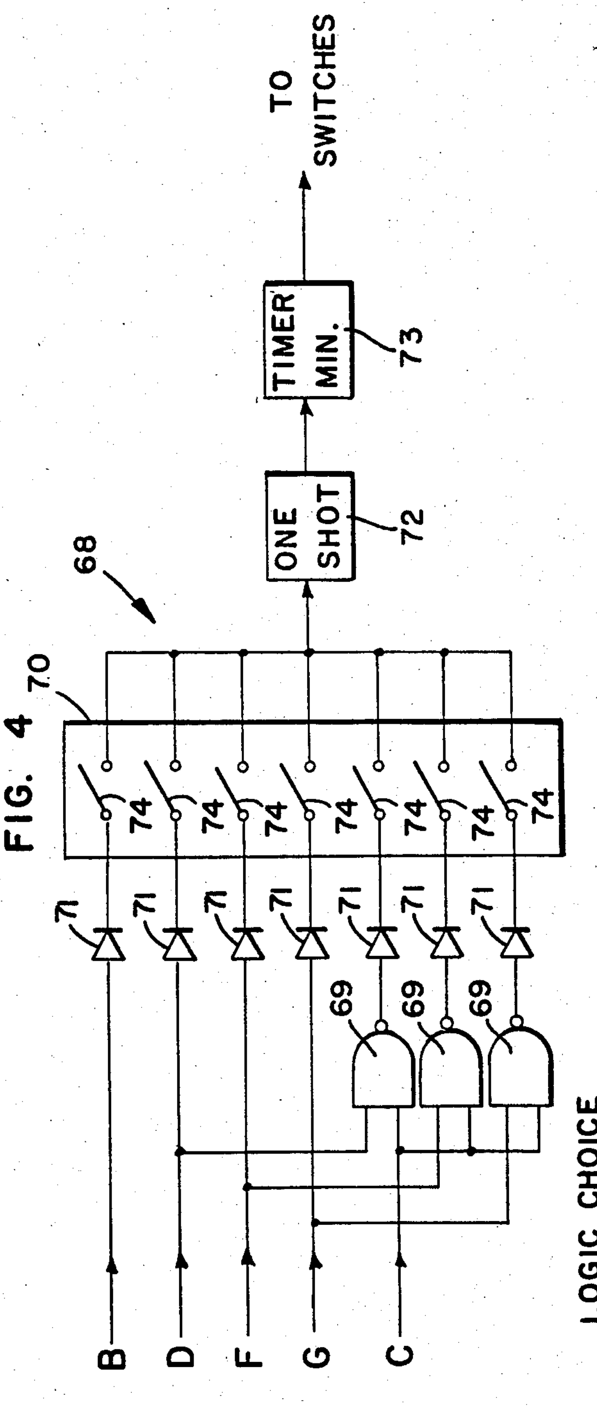
FIG. 4 is a detailed schematic diagram of one embodiment of a DIP switch selection means which enables the selection of any one of seven levels of response.

Programmable action criteria section 45 in addition to the hard-wired logic circuitry 60, examples of which were shown in FIG. 3, also contains programmable circuitry 68, examples of which are illustrated in FIG. 4. The inputs into programmable circuitry 68 are illustrated as being logic circuitry 60 outputs B, D, F, G and C. Three AND gates 69 provide additional logic inputs, namely D+C, F+C, and G+C. A seven pole dual in-line package (DIP) switch 70 permits selecting of any one or any combination of the seven logical inputs. Diodes 71 prevent any possible interaction between the various inputs. The selected input or inputs are shown being fed through a one shot 72 and a two minute timer 73. The output of timer 73 may be connected to one of switches 46 as illustrated in FIG. 2. One shot 72 provides a short delay before activating the corresponding action device 17. The delay is intended to prevent simultaneous action commands at an action device 17 such as a telephone dialer, which may be controlled by a plurality of action commands (such as when a number of different phone numbers are to be dialed). Timer 73 may be used to reestablish a time period for which the signal is on. It should be noted that while a seven pole DIP switch is illustrated, a DIP switch having any suitable number of poles may be utilized. Indeed, any suitable programmable circuitry might be utilized. Typically, the programmable circuitry 68 will contain a number of DIP switches 70 wired to different inputs and action devices 17 so that a number of different action devices 17 or combinations thereof can be activated for particular sensor 11 inputs or combinations thereof.

As illustrated in FIG. 6, several of the seven pole DIP switches 70 are positioned on the front panel of opeator console 19 so that the operator can at any time determine what actions are programmed per circuitry 68. Each set of DIP switches 70 is shown as controlling a particular action. For example, DIP switches 70*a* control external noise, whereas DIP switches 70*f* control dialing the hospital. It is readily apparent by looking at operator console 19 which logic input will initiate a particular action since each switch in the sets of DIP switches 70 is labeled with the logic code. There is shown a spare switch with each set of DIP switches 70 in FIG. 6. Easy access programming of the action criteria of system 10 at any time is accomplished at operator console 19 by use of DIP switches 70 or the equivalent thereof. It should be noted that the above discussion and illustrations are illustrative only and that any number and sizes of DIP switches 70 and logic circuitry configuration might be utilized in any particular application.

As indicated, all control in programming of system 10 is accomplished via control console 19 as shown in FIGS. 5 and 6. As shown in FIG. 5, the various indicators and controls for all of the detectors and sensors 11 are shown on the upper half of operator panel 19. One detector/sensor on/off switch 44, one present time indicator 41, and one hold indicator 42 are provided for each detector/sensor input along with a label identifying the detector/sensor and/or its location. Those items pertaining to a given detector/sensor are arranged vertically and those for other detectors or sensors 11 are placed adjacent one another across the top of operator console 19. There is one reset button 51 provided for resetting all the hold indicators 42.

The various indicators and controls for action devices 17 are positioned on the lower half of operator control console 19. One present time indicator 47, one hold indicator 48, one automatic operation cutoff switch 46, and one manual operator switch 50 are provided for each action together with a label identifying the action. In the embodiment shown, these items are arranged vertically for those items relating to a given action while those for other actions are arranged horizontally adjacent one another across operative control console 19. There is one reset button 52 proviced for resetting all the hold indicators 48.

The control for exit delay switch 32 and emergency cutoff switch 34 previously discussed are also located on operator control console 19 near the bottom thereof.

PERSON DETECTOR

Figures 7, 10:
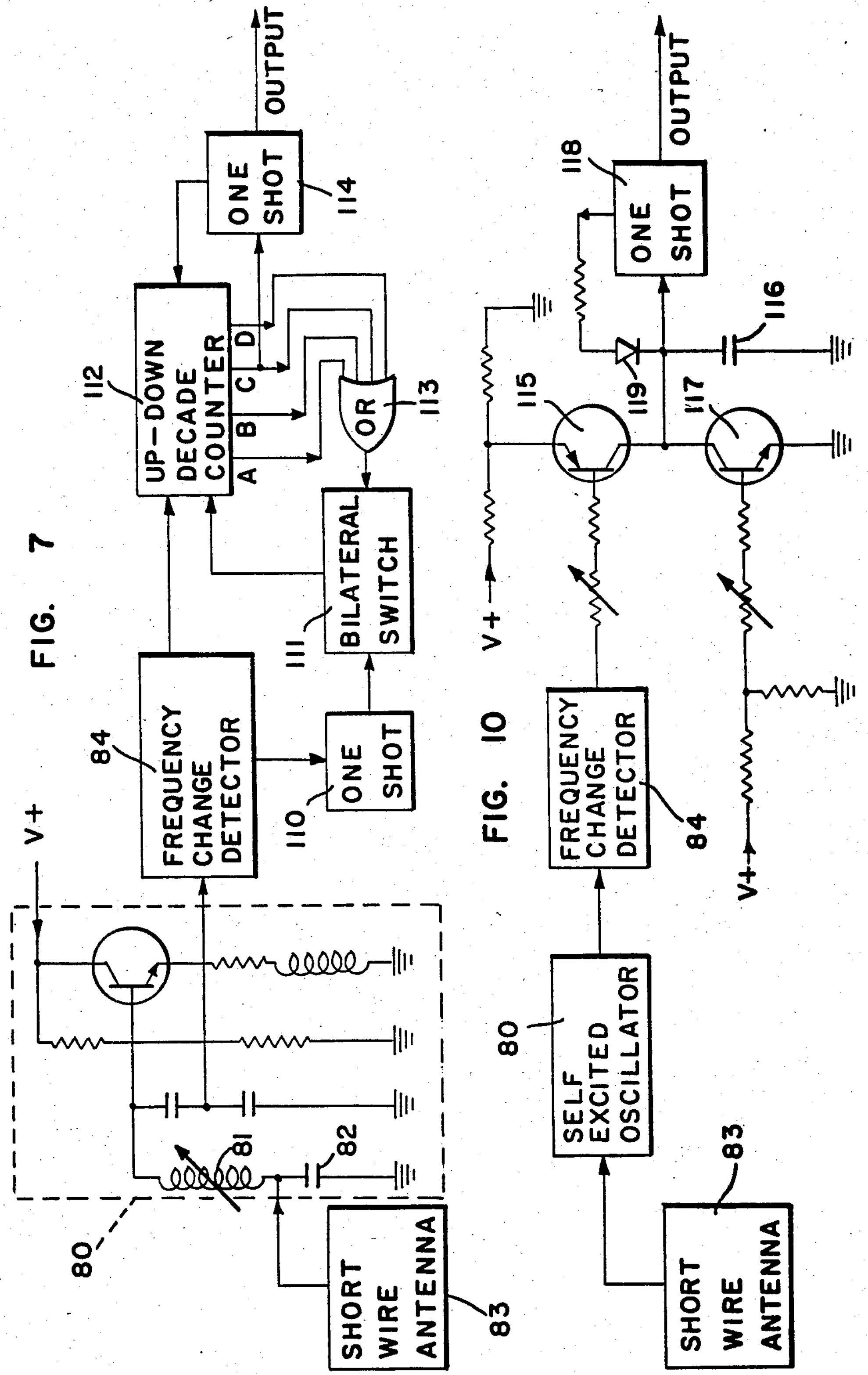
FIG. 7 is a combined block diagram and schematic of the person detector of the present invention.
FIG. 10 shows a schematic diagram of an alternative structure for processing the output of a frequency change detector.

One embodiment of person detectors 11*a* utilized in the present invention to detect intruders is shown in the combined block diagram and schematic of FIG. 7. Person detector 11*a* utilizes a series tuned colpitts-type self-excited oscillator 80 which exhibits greater frequency stability than most other oscillators. It should be noted that other types of oscillators can be used. A suitable short wire antenna 83 is shown as being connected at the junction of an inductance device 81 and a suitable capacitance device 82. Oscillation frequency of oscillator 80 is determined by the combination of inductance 81, capacitance 82, and the effective capacitance of short wire antenna 83.

In operation, an electro-magnetic field will surround the short wire antenna 83. An intruder when approaching person detector 11*a* will disturb this electro-magnetic field. The disturbance will appear as a change in the capacitive reactance of short wire antenna 83 and will hence tune oscillator 80 to a new frequency. Increased detection sensitivity may be realized by reducing capacitor 82 to a minimum value. For accurate person or intruder detection, it is necessary to be able to reliably differentiate between changes in oscillator frequency that an intruder might cause and changes due to the slow drift in oscillator frequency due to environmental causes. This will assure a low false alarm rate.

As shown in FIG. 7, the frequency signal output from oscillator 80 is input to a frequency change detector 84. Frequency change detector 84 of the present invention is well suited for differentiating between intruder detection and drift.

Figure 8:
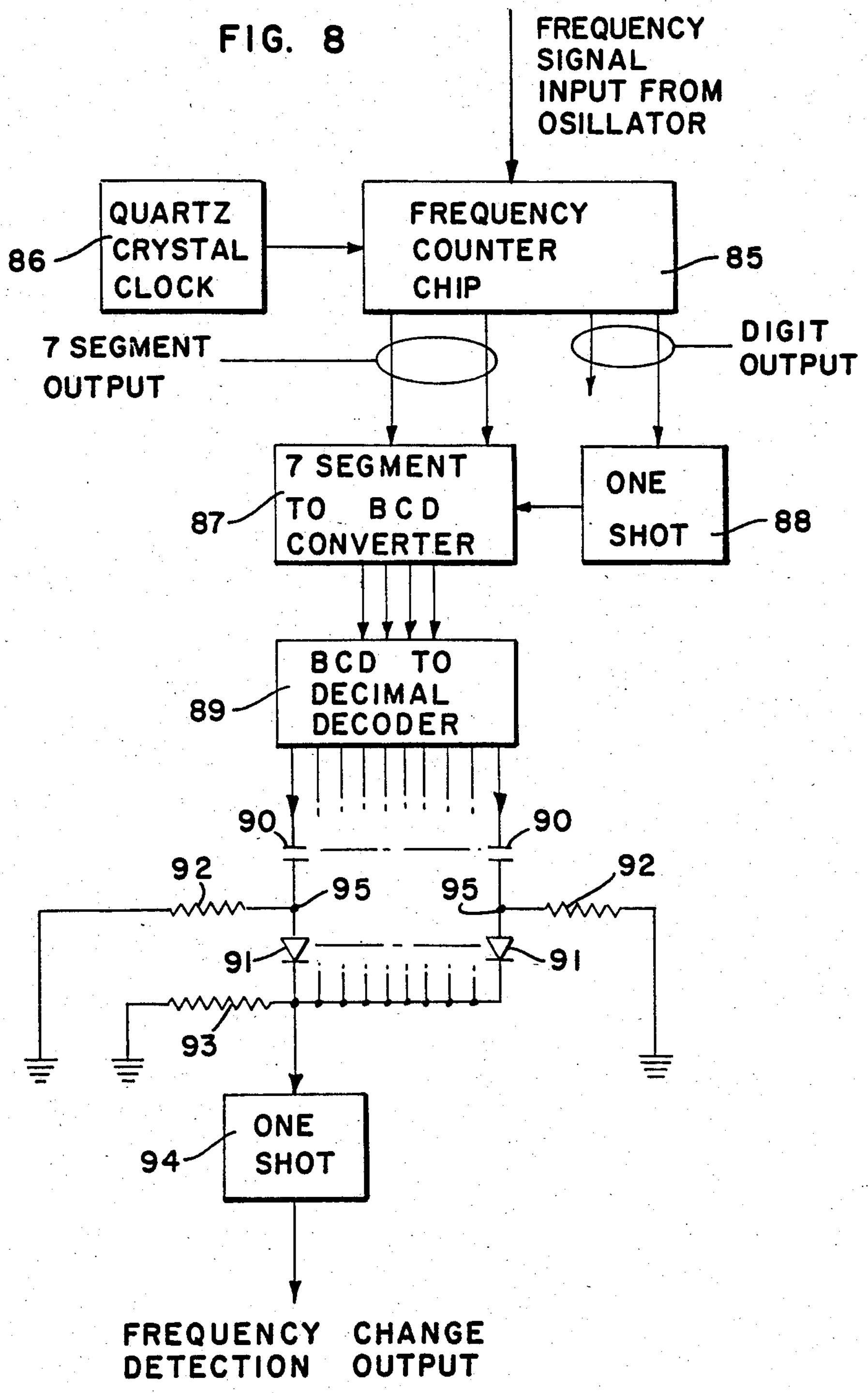
FIG. 8 is a schematic block diagram of a frequency change detector of the present invention.

A preferred embodiment of frequency change detector 84 is illustrated in FIG. 8. As shown in FIG. 8, a frequency signal input from oscillator 80 is counted by a frequency counter 85 for a precise time interval. The resulting tally is shifted to a set of latches which retain the tally until the next count is complete. After latching, counter 85 is reset for the next count. The tally is converted to seven segment decimal digits, each digit multiplexed serially to a common set of outputs. Note that all of the above functions may be performed by a circuit placed on a single silicon chip which is commercially available. A quartz crystal clock 86 may be used to generate the precise clock and timing signals needed for proper operation of frequency counter 85. In the preferred embodiment shown, these signals include a signal gate pulse, a latch pulse, a reset pulse and a multiplexing signal.

A selected digit, such as the tens digit, of the multiplexed frequency count output of counter 85 is monitored by the remainder of the frequency charge detector 84 circuitry to differentiate between oscillating frequency changes due to inherent circuitry design characteristics and frequency changes due to an actual detection of a person or moving object. To accomplish this, a decimal output format is utilized. Most, if not all, frequency counter chips 85 provide a seven segment coded output as shown in FIG. 8. Therefore, it is necessary to convert the seven segment coded output to a decimal output. One technique is as shown using a seven segment to BCD converter 87 and then a BCD to decimal converter 89.

Since only one digit is to be monitored at any given time, the multiplexed output of frequency counter 85 must be demultiplexed by converter 87. A timed latch enable pulse from monostable multivibrator (one shot) 88 latches the count tally for the one selected digit and converter 87 holds it as a BCD output for one count period such as 0.2 seconds. This includes a 0.1 second count time plus 0.1 seconds latch react time. Note the count period may vary depending on the digit being monitored. One shot 88 is triggered by the signal corresponding to the selected digit being output from frequency counter 85, there being a separate output for each digit of the decimal representation of the counted value. The digit output selected coincides with the portion of the multiplexed time sequence that contains the seven segment data.

The purpose of one shot 88 is to ensure that converter 87 latches the desired seven segment data of the selected digit without ambiguity or error. One shot 88 generates a latch signal that enables converter 87 to latch at a time certain to capture the correct digit, which is midway between the beginning and end transition points of adjacent sets of multiplexed data. One shot 88 is triggered by the leading edge of the selected digit output pulse, which is coincident with the latching of the desired seven segment data. The one shot signal corresponding to the selected digit lasts one half of the total time the desired seven segment data is available during multiplexing. Thus, the trailing edge or recovery edge of the pulse output from one shot 88 is timed to occur midway during a latch period.

BCD to decimal decoder 89 indicates the numerical value of the selected digit by causing one of the ten output leads representing a value zero to nine to rise to the pulse supply voltage (+VCC) level while the others remain at ground potential.

To accomplish the purpose of the present invention, each of the ten outputs of converter 89 has a capacitor 90, a diode 91, and a resistor 92 interconnected therebetween and suitably grounded. Each of the ten outputs are then interconnected so as to have a common resistor 93 suitably grounded and a one shot 94.

Figure 9:
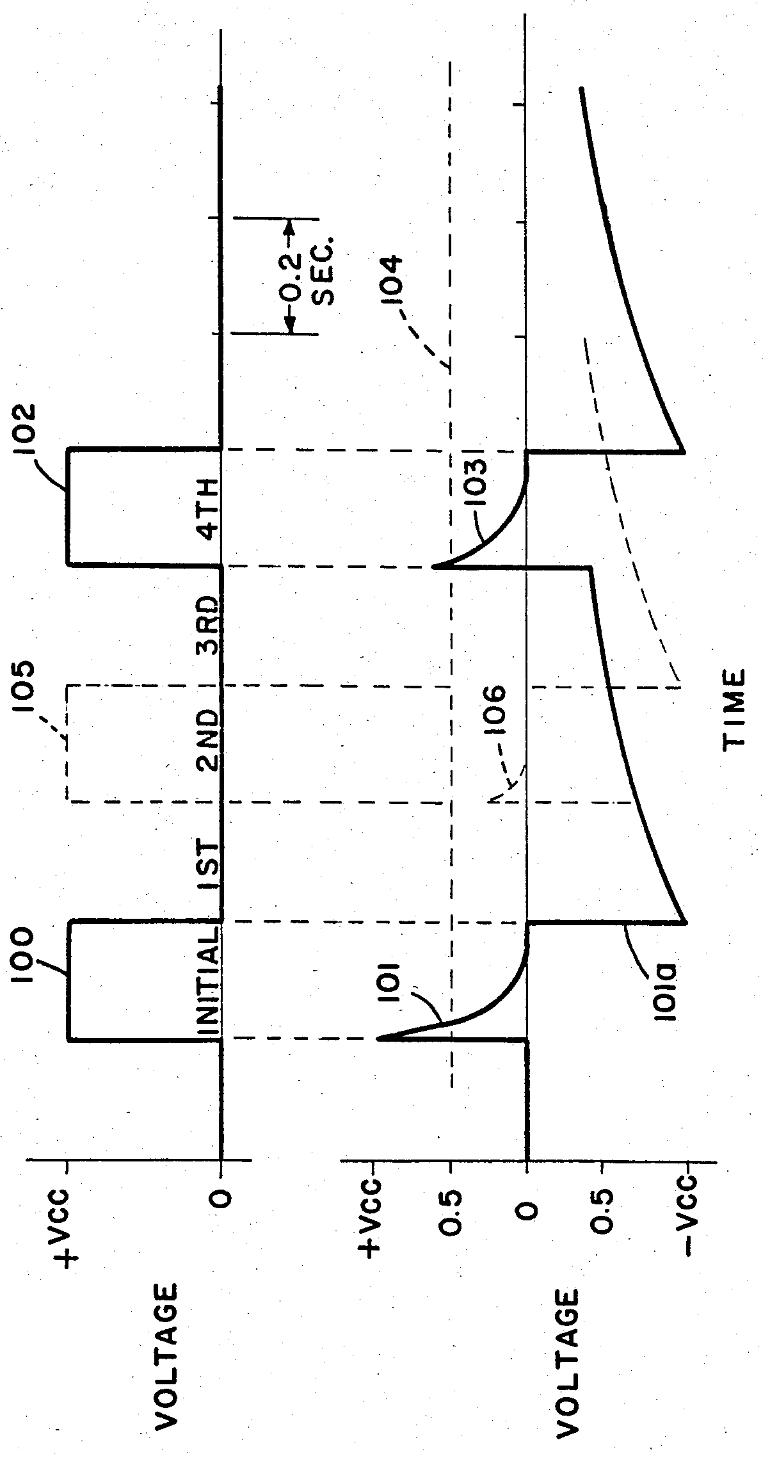
FIG. 9 shows a set of wave forms occurring at two locations in the frequency change detecter.

FIG. 9 illustrates the voltage-time wave forms present at two points in the circuitry between converter 89 and one shot 94. The upper set of waveforms are those that may appear on any one of the ten converters 89 outputs while the lower wave form may appear at the input of one shot 94. In the preferred embodiment, one shot 94 is a CMOS-type which triggers when the input signal rises above one half of +VCC, however one shot 94 may be any suitable one shot type device having a suitable trigger level. In addition, one shot 94 also has a sufficiently high input impedance that does not modify the time constant of the resistive and capacitive components in the circuitry. Capacitor 90, diode 91, resistor 92 and resistor 93 form a dual time constant system, the time constant varying according to the polarity of the voltage present. The variation in time constants is brought about by diode 91 effectively isolating resistors 92 from resistor 93.

If a pulse, represented by waveform 100 in FIG. 9, appears on one decoder 89 output lead and remains for only one count interval (in the preferred embodiment shown in this is 0.2 seconds), the signal at the input of one shot 94 will look like waveform 101. Here the rising edge of the pulse is preserved but due to the short time constant, the pulse completely decays to ground in 0.2 seconds, due to capacitor 90 fully charging through resistors 92 and 93. When the pulse terminates after 0.2 seconds, the voltage at junction 95 and the input of one shot 94 will go negative the full extent of the pulse magnitude, as the negative portion **101*a* of waveform 101 indicates. Assuming no other pulse outputs, capacitor 90 will slowly discharge at a rate typically selected such that by the beginning of the fourth count interval after the initial pulse the voltage at junction 95 will have risen more than 50 percent of its initial value, as indicated. If at the beginning of the fourth count interval a pulse occurs (represented by waveform 102), the voltage at the input to one shot 94 will appear as illustrated by waveform 103, resulting in the triggering of one shot 94**.

The trigger level 104 of one shot 94 is illustrated in FIG. 9. If pulse 102 had occurred at the first, second or third count period after initial pulse 100, one shot 94 would not have been triggered because the positive pulse added to the negative charge across capacitor 90 would not have exceeded trigger level 104. This is illustrated by corresponding pulses 105 and 106. It is evident that if the selected digit being output was alternating between two values, after the first triggering of one shot 94 for each alternating digit there would be no further triggering. Note that the time constants may have other suitable values so that one shot 94 will trigger at any desired count period.

From the above description, it is evident that frequency change detector 84 is capable of detecting changes in frequency and at the same time is capable of suppressing spurious or meaningless changes in frequency that arise from characteristics of a digital frequency counter. The least significant digits of a digital frequency counter may exhibit more or less constant oscillation between two values and a selected digit may oscillate as a slightly unstable counter input frequency drifts through a transition phase between two values of frequency. The present invention is capable of suppressing both of these types of frequency changes.

It should be noted that any digit may be selected for monitoring purposes depending on the requirements of the system. Multiple digits might even be monitored. If it is necessary to use the least significant digit (LSD) or ones digit of a frequency counter output, this output will be found to almost continuously alternate or oscillate from count period to count period between two values of that digit. This is due to an ever changing phase relationship between the input frequency and the counter input gate.

As mentioned, spurious responses can also rise in the other digits as well. Given a slowly drifting and somewhat unstable input signal frequency, as from self-excited oscillator 80, there will be periods of time when the input signal frequency will be drifting past the transition point between two numerical values. Frequency change detector 84 as described above is capable of detecting these changes due to drift and discarding them. Note it is evident that the absolute value of the frequency generated by oscillator 80 is unimportant to frequency counter 85 operation, thus the desired change in frequency is unambiguously detected.

When exceedingly low false alarm rates are required as in an intruder detection system, then the combination of the precise digital frequency change detector 84 and oscillator 80 may need additional safeguards for several reasons. One reason is that oscillator 80 frequency may change from causes other than short wire antenna 83 field effects. These causes might be DC power changes arising from surges or changes in powerline voltages. Another reason is that the frequency change detector while suppressing spurious responses may not be 100 percent perfect.

Therefore, for the above cited reasons and for the reason that it is not desirable to activate one of action devices 17 on the first detection of a slight change in oscillator 80 frequency, it is clear that frequency change detector 84 output needs to be subjected to a go no-go decision process. Such a decision process may be based on criteria that make the greatest possible distinction between the characteristics of a desired signal and those of random noise.

An intruder entering the field of antenna 83 will cause a continuous frequency change with time. Consequently, frequency change detector 84 will register continuous detections. Conversely, when there is no actual field disturbance due to an intruder, frequency change detector 84 will register a false output noncontinuously and at random intervals. If oscillator 80 is drifting slowly there will also be occasional frequency change detections caused by the frequency of oscillator 80 drifting from one value to the next. Since the drift of oscillator 84 confuses intruder detection, detections caused by frequency drift should also be considered noise and should be disregarded in the go no-go decision.

One form of a go no-go decision process would involve monitoring for consecutive detection during consecutive counting periods of frequency counter 85. For example, if four consecutive detections were required before an output to data sender 12 occurred, the probability of a proper detection would be very high. However, if out of four consecutive count periods, only three detections were registered, than the probability of a correct detection would be diminished. To recover the desired probability of a correct decision, the decision process might require a detection to make up for every missed consecutive detection. Such a go no-go decision process requires a high degree of consistency in the frequency change detection which thus is designed to disregard random noise-like false frequency changes. The present invention utilizes such a go no-go decision process. However, it should be understood that any suitable decision process might be utilized.

One embodiment of the go no-go decision process is accomplished by the circuitry shown in FIG. 7 consisting of a monostable multivibrator (one shot) 110, bilateral switch 111, up-down decade counter 112, OR gate 113, and one shot 114. One shot 110 receives a latch pulse signal from frequency counter 85 of frequency change detector 84. One shot 110 sends this count period signal to bilateral switch 111. The latch pulse signal marks the termination of each count period and provides a timed output. Decade counter 112 receives the frequency change detection output of frequency change detector 84. Upon receipt of a detection signal from frequency change detector 84, decade counter 112 increments. Decade counter 112 receives a count period signal output from one shot 110 via bilateral switch 111 at a separate input terminal. Upon receipt of the count period signal, decade counter 112 decrements. Decade counter 112 is connected so that when a detection signal is present within a count period, the count period signal is inhibited and decade counter 112 is stepped up one number. If no frequency change detector 84 output is received at the end of a count period, then the count period signal, which occurs at the end of every count period will not be inhibited and decade counter 112 will be stepped down one number.

Decade counter 112 provides a BCD output on the four leads labeled A, B, C and D. Upon a count of four, there is a rise in the voltage potential on output C which in turn triggers one shot 114. One shot 114 upon being triggered resets decade counter 112 and provides an output to data sender 12. Decade counter is therefore reset to zero when a count of four is reached such that the go no-go decision process can be repeated. OR gate 113 connected to the BCD output of decade counter 112 detects a zero count and signals bilateral switch 111 not to decrement decade counter 112. When decade counter 112 is at zero, OR gate 113 and bilateral switch 111 thus prevent and further decrementing of decade counter 112.

The embodiment of the go no-go decision process illustrated in FIG. 7 is a preferred implementation. An alternative go no-go decision process embodiment is shown in FIG. 10 consisting of a constant current source, transistor 115, which receives the output of frequency change detector 84, constant current sink transistor 117, capacitor 116, one shot 118 and reset diode 119. One shot 118 has a sufficiently high input impedance that the charge on capacitor 116 is unaffected. Capacitor 116 is charged in equal steps by transistor 115 and if the steps are uninterrupted, the voltage appearing across capacitor 116 will rise to a level coincident with the number of steps reaching a preselected number such as four, that triggers one shot 118. One shot 118 upon being triggered, provides an output and also resets capacitor 116 to a zero count via diode 119 whereupon the cycle repeats.

Constant current transistor 117 supplies a current flow which continually discharges capacitor 116 and in the absence of the charging step by transistor 115 will discharge capacitor 116 to a zero count. The end result is that for any intercount period, capacitor 116 will be discharged a selected amount for every non-detection and capacitor 116 will be charged a selected amount for every detection made. The amount of discharge for the intercount period can be chosen to equal one step level of charge. Thus for every missed detection a makeup detection will be required. Other numbers of steps and configurations can readily be chosen and used.

Short wire antenna 83 of person detector 11*a* may be a fine wire which is taped around a door or window frame or at any other preferred location. The wire can be shaped or tailored so the detection coverage is only over an area where desired. For example, the doors might be wired to exclude detection of animals.

Person detectors when installed on the inside of exterior doors and windows retain their ability to detect intruders for short distances outside the structure. This capability arises from the ability of electro-magnetic waves to readily penetrate building materials. The person detector 11*a* will require no alignment or adjustment when installed or at any time thereafter. The counter frequency of self-excited oscillator 80 is not critical because frequency change detector 84 has been designed to function with a wide range of input frequencies. Consequently, no alignment of oscillator frequency is necessary.

While the above description contains many specificities, these should not be construed as limitations on the scope of the invention, but rather as an exemplification of various embodiments thereof.

TELEPHONE STATUS REPORT SYSTEM

Figure 11A:
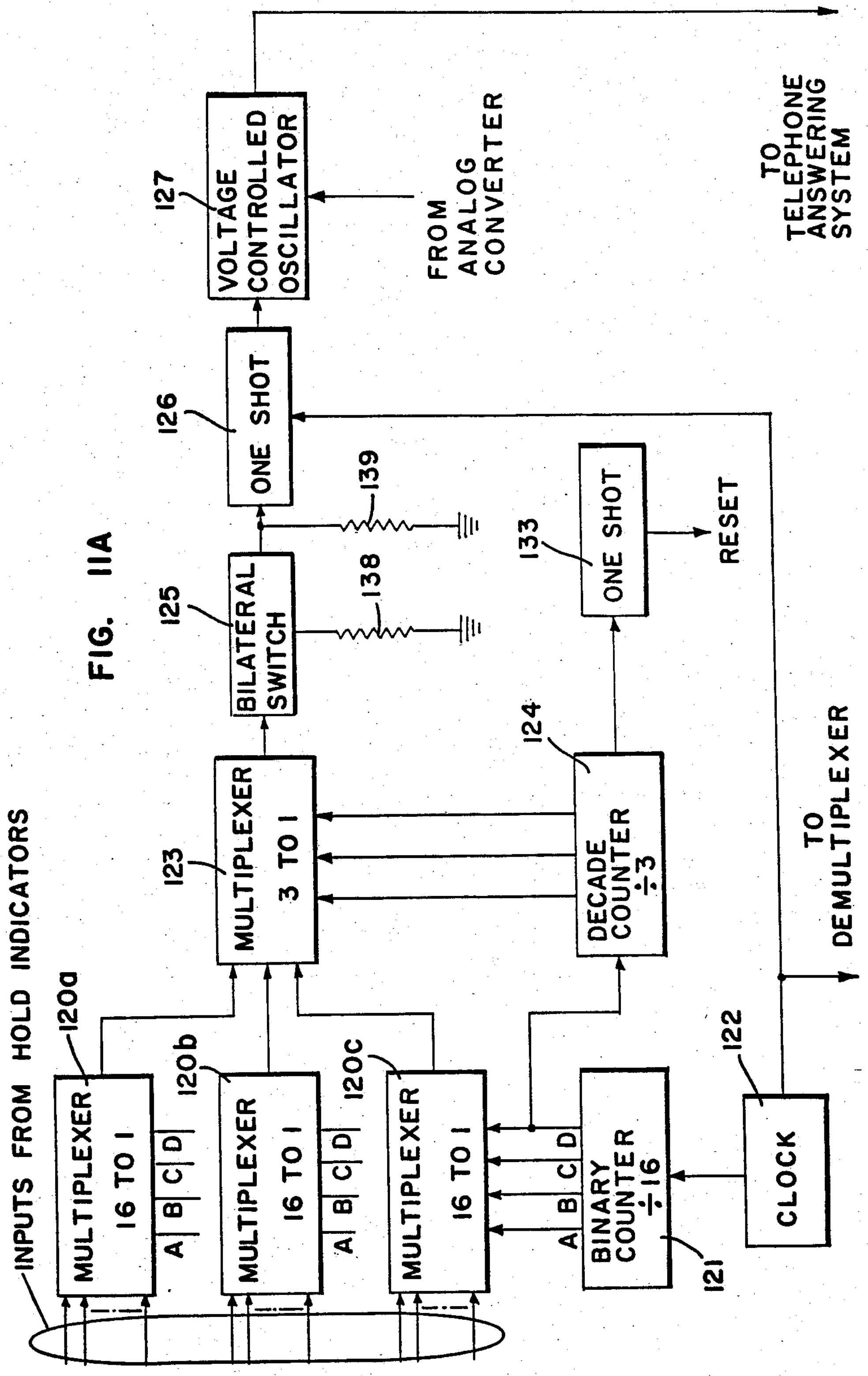
FIGS. 11A, B are a block diagram of an embodiment of the telephone status report system of the present invention.
Figure 11B:
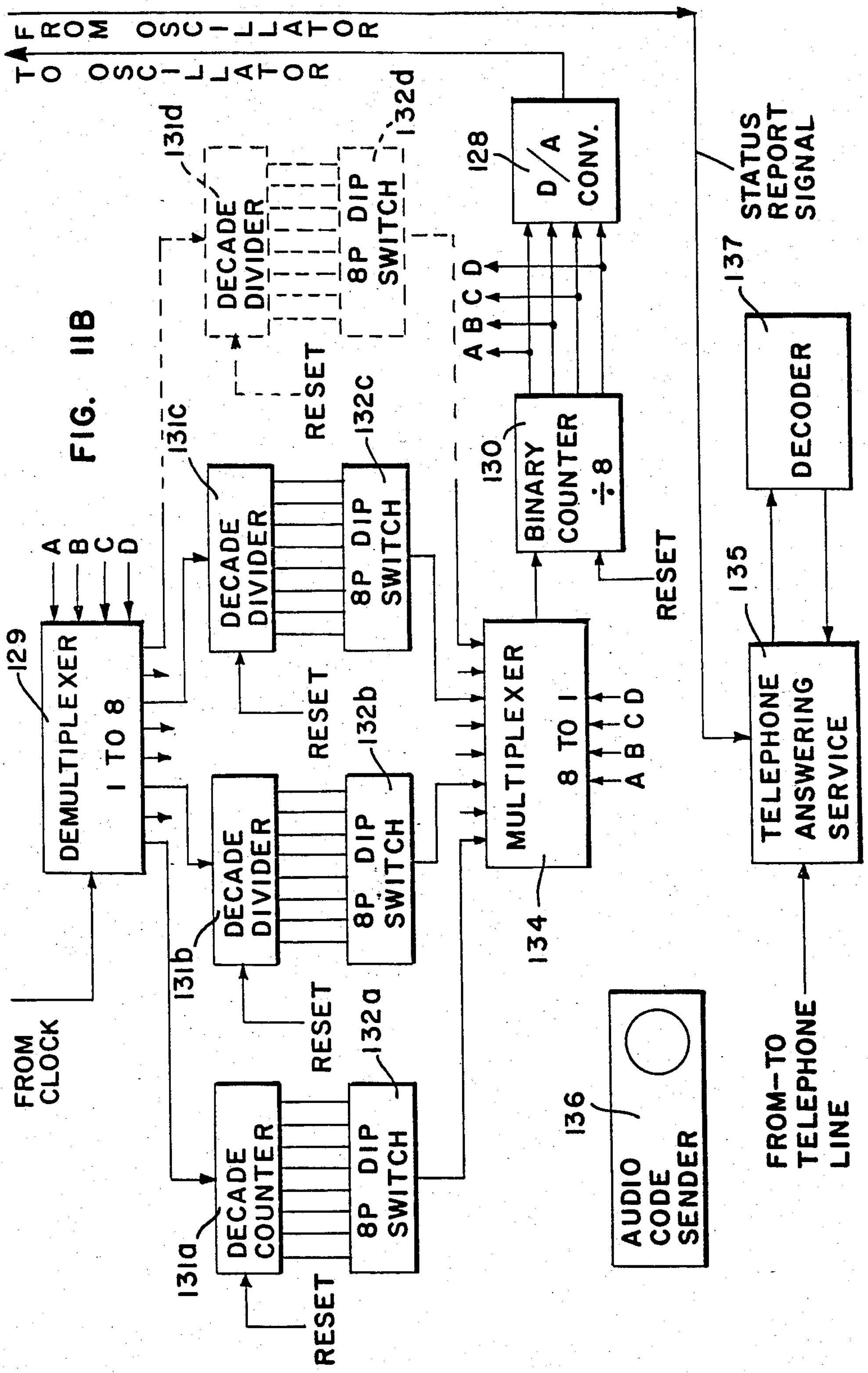

FIGS. 11A, 11B illustrate an embodiment of telephone status report system 18. The hold indicators 43, 49 of system 10 provide the inputs into multiplexers 120*a, b, c*. These inputs are normally low unless a previous or present sensor detection or action operation has occurred, in which case they go high and remain high until reset. Multiplexers 120 are strobed by divider 121 and clock 122, their outputs further multiplexed by multiplexer 123 and counter 124. Thereby the inputs into multiplexers 120 are sampled sequentially and any highs will carry through to the output.

Any high input to bilateral switch 125 will cause the total resistance appearing at its output to increase. This resistance is part of the RC time constant network of one shot 126, which includes resistors 138 and 139. One shot 126 is triggered by clock 122. As a result of the increase in resistance, the pulse width of one shot 126 will increase. In one preferred embodiment, the short pulse duration of one shot 126 is one third second, the long pulse duration being two-thirds seconds. Clock 122 triggers one shot 126 at a pulse rate of about one pulse per second. The output of one shot 126 enables voltage controlled oscillator 127 to oscillate at the audio frequency determined by the stair step waveform that is generated by the digital to analog converter 128 illustrated in FIG. 11B. Voltage controlled oscillator 127 will thus generate short or long tone pulses with the pitch or frequency of the tone stepping higher as the multiplexer strobing action moves from one category of detectors and actions to the next. The tone pulses are sent to a telephone answering system 135 and serve as the status report; long pulses indicating detections or actions, short pulses indicating no detections or no actions.

Note that detectors 11 or actions may be grouped into categories to reduce the number of frequency changes necessary for a status report. Each category may have one or more detectors 11 or actions. The categories may be arranged according to whatever criteria are desired.

Each step of the waveforms generated by converter 128 coincides with a given category of detectors 11 or actions. Therefore, it is necessary to know the number of detectors 11 in each category such that the waveform generator portion of telephone status report system 18 can be designed to successively count these numbers for each category so as to generate a different tone upon reaching a different category. Since the embodiment of the waveform generator circuitry of telephone status report system 19 as shown in FIG. 11B is set up such that the count cannot exceed eight for any category, if there are more than eight sensors or actions in a particular category of sensor, the category will be split into two categories. For example, if there are twelve person detectors in the same general category, the category can be split into two categories of eight and four detectors.

An eight to one demultiplexer 129 accepts the 1.0 hertz signal from clock 122 and outputs this signal to any of eight outputs as determined by the BCD inputs A, B, C, D from a binary counter 130. Binary counter 130 accepts reset input from one shot 133, initiating the generation of the stair step waveform in synchronism with the strobing of multiplexers 120. The first category count will be done by a decade counter **131*a* and an eight-pole DIP switch 132*a*. The switch 132*a* passes the desired count, which corresponds to the number of detection or action devices in a given category, and feeds the output to a multiplexer 134. In the example given above, where there are two categories of eight and four detectors, switch 132*a* would be set to select a count of eight. Multiplexer 134 is strobed by the BCD inputs A, B, C, D from binary counter 130 which is reset to the start count by the output of one shot 133**.

When decade counter 131 has counted eight, the output will feed through the corresponding switch of switches **132*a* to multiplexer 134, which is synchronized to receive the signal, and into binary counter 130 which will then step one count. Demultiplexer 129 and multiplexer 134 will then be incremented one position and the second category decade counter 131*b* will be connected into the circuit to count four per this example as provided by switch 132*b*. When a count of four is reached, multiplexer 134 will again step counter 130 one count and demultiplexer 129 and multiplexer 134 will be incremented to the third position. This process will continue for as many categories as there are present and then will be reset to start again in synchronism with the strobing of multiplexers 120. Counters 130 and 131 are all reset by one shot 133. The BCD output of binary counter 130 is connected to digital to analog converter 128** which generates the stair step waveform. The above description of the waveform circuitry was for a sample embodiment and should not be construed as in any way limiting the scope of the invention.

A standard commercially available telephone answering system 135 is modified and used to place the status report signal on the telephone line. It is used in conjunction with a pocketable audio code sender 136 and a decoder 137. Audio code sender 136 is connected acoustically to the transmitter of a standard telephone and is used to generate a code which is sent from a remote telephone location. When the coded signal is received and recognized by decoder 137, the telephone answering system will be activated to send the status report out to the remote telephone.

Decoder 137 is preset to respond to a particular code. Telephone answering system 135 normally answers and records calls until an encoded signal is received from audio code sender 136 which matches the preset code. Then answering system 135 is reset and maintained in a transmit phase until hangup of the phone at the remote location. While in the transmit stage, telephone answering system 135 sends out the status report from voltage controlled oscillator 127 which continuously sends the report to answering system 135. This permits the person at the remote phone to listen to the status reports as many times as desired and to terminate all action upon hanging up the phone.

Figure 12:
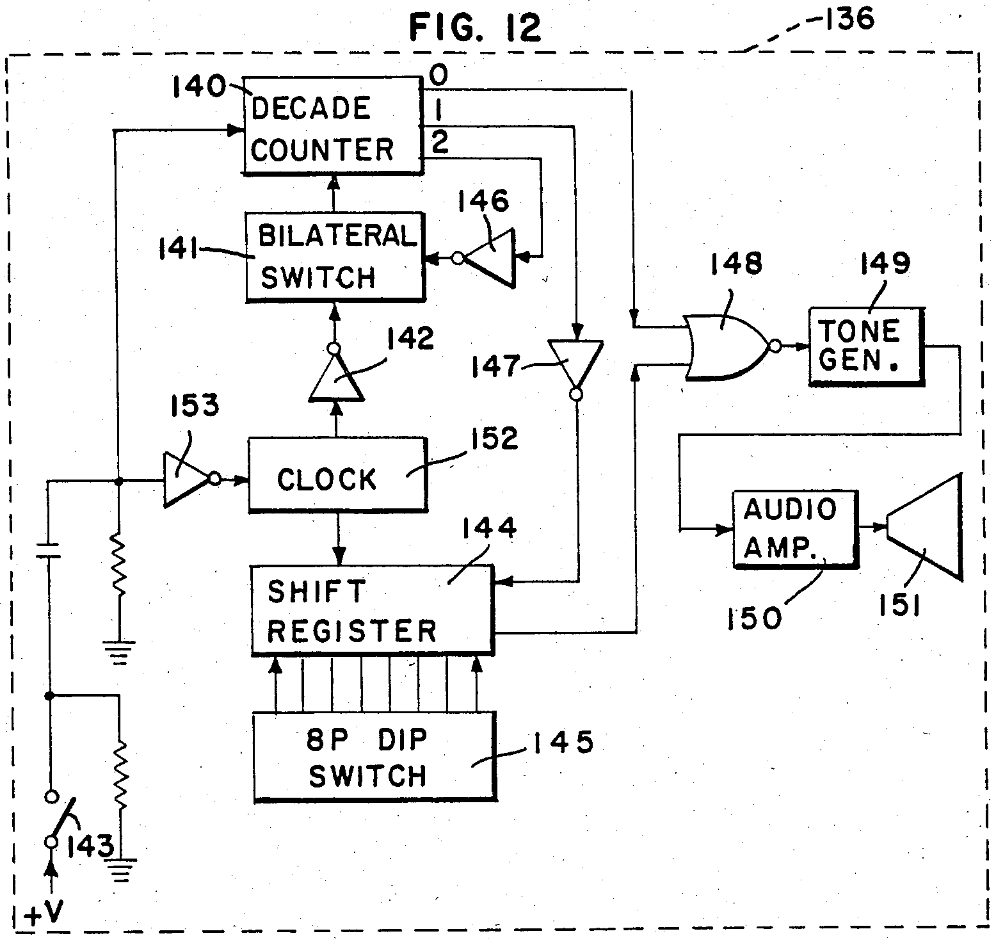
FIG. 12 is a schematic block diagram of the audio code sender circuitry of the telephone status report system.

FIG. 12 illustrates a block diagram of a preferred embodiment of audio code sender 136. It consists of a decade counter 140, a bilateral switch 141, an inverter 142, a code initiating switch 143, a shift register 144, eight pole DIP switch 145, an inverter 146, an inverter 147, NOR gate 148, a tone generator 149, an audio amplifier 150, a speaker 151, and a clock 152. Shift register 144 and eight pole DIP switch 145 permit any eight-bit code to be set up. Clock 152 times the code generation and decade counter 140 facilitates the addition of a decoder setup prepulse with a selected space between prepulse and code group which acts to add additional coding elements to the code group that must be recognized by decoder 137 before it releases a status report. Note that shift register 144 could be extnded to handle more bits if desired.

Figure 13:
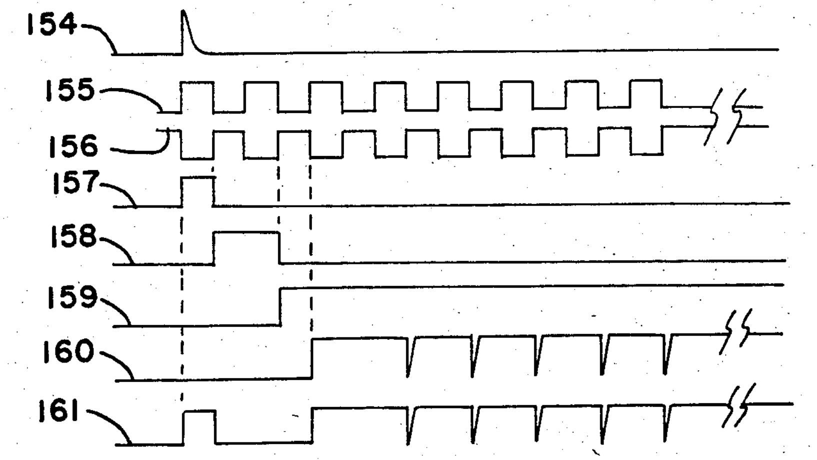
FIG. 13 illustrates the time relationship of the wave forms present in the audio code sender.

In the embodiment shown, switch 143 on code sender 136 resets decade counter 140, and clock 152 via inverter 153, initiating a coded transmission. The time relationship of the various signals is shown in FIG. 13. Switch 143 generates a signal waveform 154 which resets clock 152 as shown by a waveform line 155 and resets decade counter 140 to zero as shown in a waveform 157. Signal 157 is sent from the zero output of decade counter 140 to NOR gate 148 and on to tone generator 149 and thence to audio amplifier 150 and speaker 151. Waveform 156 shows the clock signal as inverted by inverter 142. Since decade counter 140 is set to zero, there will be no output at this time on decade counter 140 output for the second count (labeled 2). This low output coupled through inverter 146 will place a high on the gate of bilateral switch 141 thereby closing 141. The inverted clock signal will pass to decade counter 140 and one half cycle later will step decade counter 140 from zero to one as illustrated by waveforms 156, 157, and 158 of FIG. 13. The signal from decade counter 140 for the first counter (labeled 1) is sent via inverter 147 to shift register 144 to load the preset code of eight pole DIP switch 145. One inverted clock cycle later, decade counter 140 will again be stepped one count as line 158 and 159 show. The second count ouptut of decade counter 140 (labeled 2) is fed to bilateral switch 141 via inverter 146 cutting off any further possibility of clock 152 stepping decade counter 140. Decade counter action is locked up until again reset by switch 143.

One half clock cycle later as illustrated by lines 155 and 160, clock 152 will shift the first bit out of shift register 144 and one more bit each succeeding clock cycle until all bits have been shifted out. The composit code signal will look like a waveform 161. The code bits are fed to NOR gate 148 and thence to tone generator 149, audio amplifier 150, and speaker 151. Tone generator 149 is set to a predetermined frequency which matches the selected tone decoder frequency. Thus, serving as one more additional factor which must be met in order to access a status report. At this point, decade counter 140 is locked up and shift register 144 is empty and thus nothing further will happen until a second coded transmission is necessary in which case closing switch 143 will again initiate one more transmission.

Figure 14:
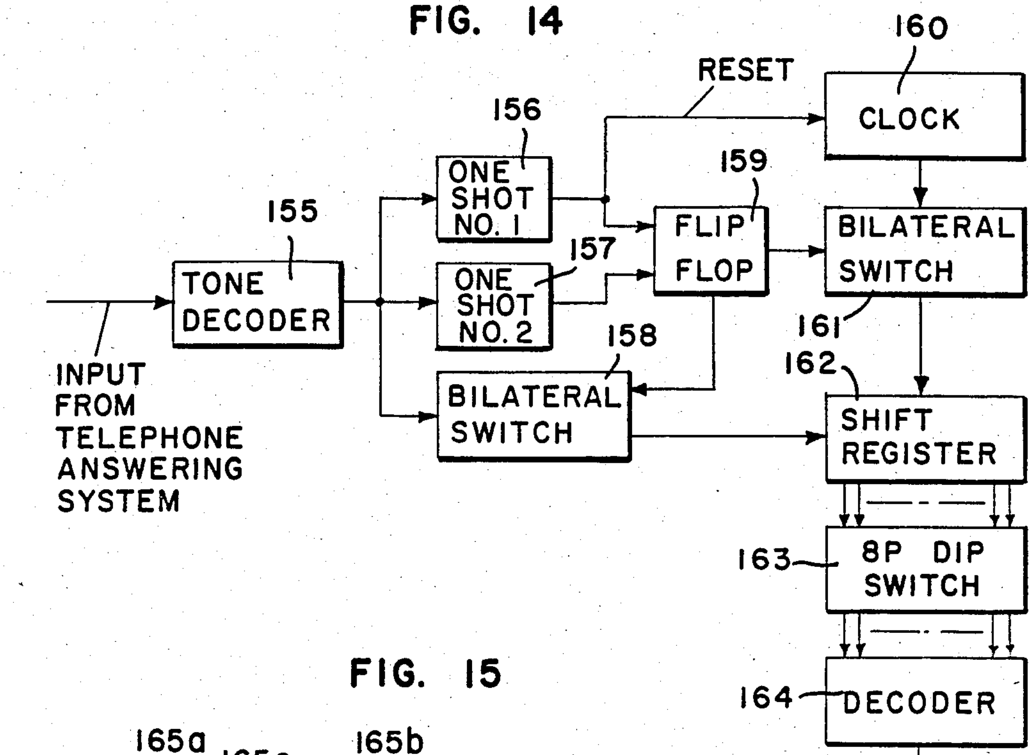
FIG. 14 is a block diagram of the decoder mechanism of the telephone status report system.
Figure 15:
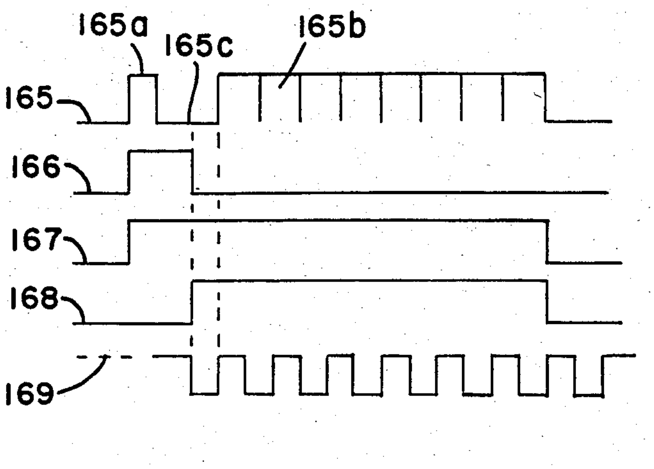
FIG. 15 illustrates the timing of the wave forms present in the decoder.

An embodiment of decoder 137 is illustrated in block diagram form in FIG. 14. A tone decoder 155 is tuned to the same frequency as audio code sender 136 and thus is receptive to this one particular frequency. The output of tone decoder 155 is connected to one shots 156 and 157 and to a bilateral switch 158. When the prepulse or setup pulse of a code group is received, one shots 156 and 157 will trigger. One shot 156 is timed to recover in the time period between the setup pulse and the code group as shown by waveforms 165 and 166 in FIG. 15. Waveform 165 shows the setup pulse 165*a*, the eight bit code group 165*b*, and the space between the signals 165*c*. Waveform 166 shows the output of one shot 156 with its recovery time to fall in the above-mentioned space. Waveform 167 shows the output of one shot 157. One shot 157 is timed to recover just after the code group terminates as shown by waveform 167. Flip flop 159 is connected to be set by the falling edge of waveform 166 of one shot 156 and to be reset by the falling edge of waveform 167 of one shot 157.

Waveform 168 shows the output of flip flop 159 which can be seen to rise with the falling edge of waveform 166 and fall with the falling edge of waveform 167.

Clock 160 is reset by one shot 156 to align its falling edge with that of one shot 156 as shown by waveforms 166 and 169. Thereafter its rising pulse edge is used to step the code bits into shift register 162. The output waveform of flip flop 159 is used to close bilateral switches 158 and 161 which allows the clock signal to pass on to shift register 162 and the incoming code group also to pass on to shift register 162. When shift register 162 has been loaded with eight bits, as in this example, the data is output in parallel to DIP switch 163 and then to a decoder 164. If the eight data bits match the preprogrammed code, an output will be obtained which is used to reset the telephone answering system. DIP switch 163 permits any eight bit code to be selected or reselected. It will be noted that if the setup pulse is not positioned correctly or is missing, or if the audio tone is not correct or if the eight bit code is incorrect, no decoder output will occur. It should be noted that a code other than an eight-bit code might be utilized.

While the above description contains many specifications, these should not be construed as limitations on the scope of the invention, but rather as an exemplification of various embodiments thereof.

SECURE RELIABLE DATA LINK

The secure reliable data link portion of the present invention enables the transmission of encoded digital data via an RF frequency from detectors 11 at remote locations to programmable central data processor 14 and then from programmable central data processor 14 to action devices 17 at remote locations. Data senders 12, 13 and receivers 15, 16 of the present invention are a part of the secure reliable data link portion of the present invention.

Figure 16:
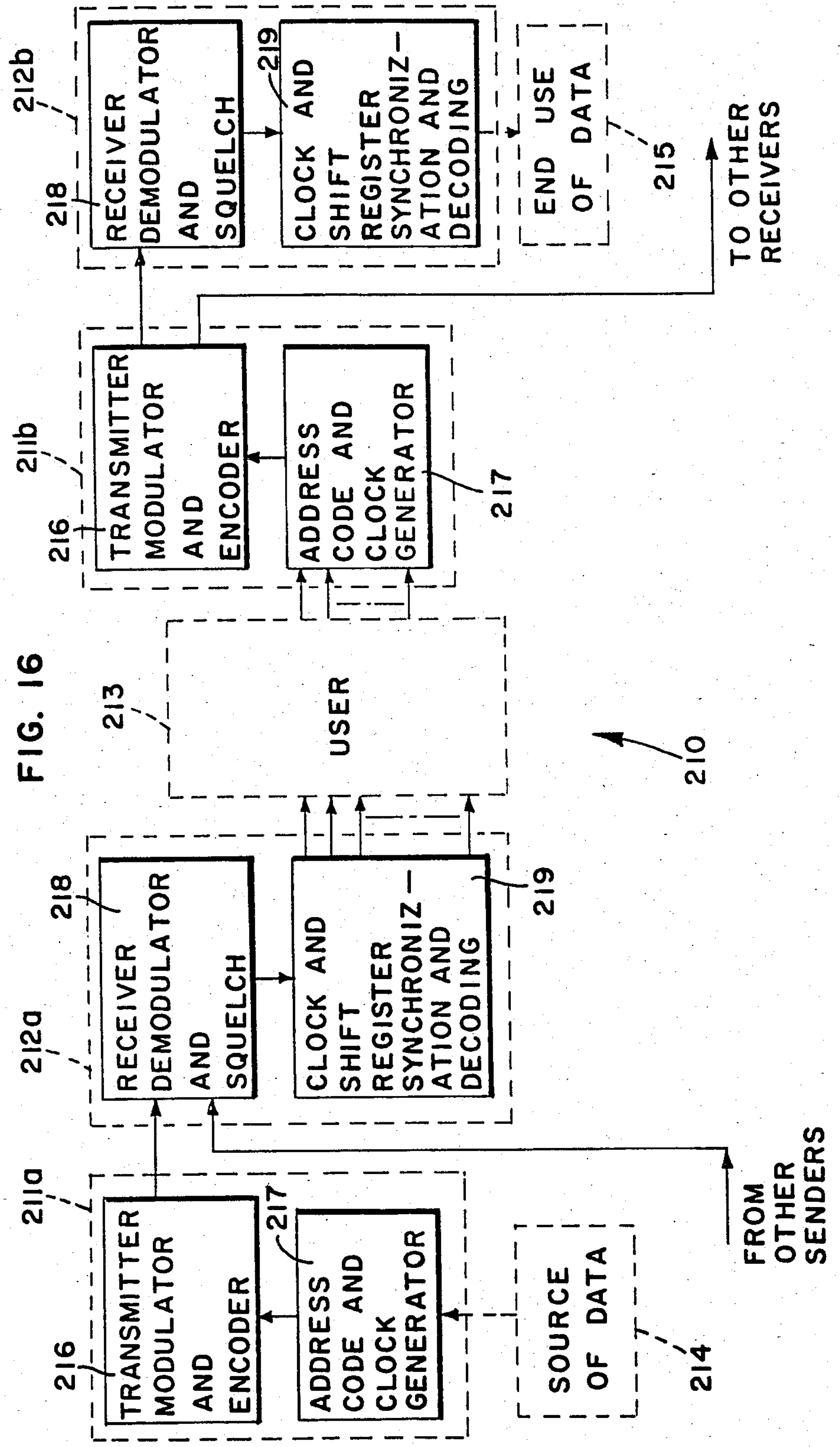
FIG. 16 shows a block diagram of an embodiment of a secure reliable data link of the present invention.

As shown in the block diagram of FIG. 16 the secure reliable data link portion, generally designated as 210, can be utilized in many applications. Secure reliable data link 210 includes senders or transmitters 211*a* which upon receipt of data from a data source 214 encode and transmit digital data via an RF frequency to a receiver 212*a*. Receiver 212*a* upon receipt of the encoded data, decodes the data and makes it available to a user generally designated as 213. A sender or transmitter 211*b* upon receipt of data from user 213 then encodes the data and transmits encoded digital data via an RF frequency to receivers 212*b*. Each receiver 212*b* receives and decodes the data directed to that particular receiver 212*b* and then delivers the decoded data to end users generally designated as 215. Note that in the present invention, data sources 214 are detectors 11, user 213 is programmable central data processor 14 and end users 215 are action devices 17. However, the secure reliable data link 210 may be utilized in several applications where data sources 214 and users of data 213, 215 may take on many different characteristics and functions.

In the application of secure reliable data link 210 illustrated in FIG. 16, sender 211*a* is shown as accepting input from data source 214. Sender 211*a* is shown as encoding and transmitting the data to receiver 212*a*. However, sender 211*b* is shown as accepting many separate messages which are then encoded by sender 211*b*. Sender 211*b* then addresses and transmits the many messages to separate receivers 212*b*. Senders 211*a*, *b* are similar in their circuitry but as FIG. 16 illustrates are adaptable to provide varying capability within secure reliable data link 210. Likewise, this is also true of receivers 212*a*, *b*. While receiver 212*a* is shown as accepting multiple inputs and receiver 212*b* is shown as accepting single inputs, receivers 212*a*, *b* are similar in their circuitry and may be adapted according to system 210 needs.

Each sender 211 is shown as having transmitter, modulator, and encoder circuitry 216 and address code and clock generation circuitry 217. Each receiver 212 is shown as having receiver, demodulator and squelch circuitry 218 and clock and shift register synchronization and decoding circuitry 219.

Figure 17:
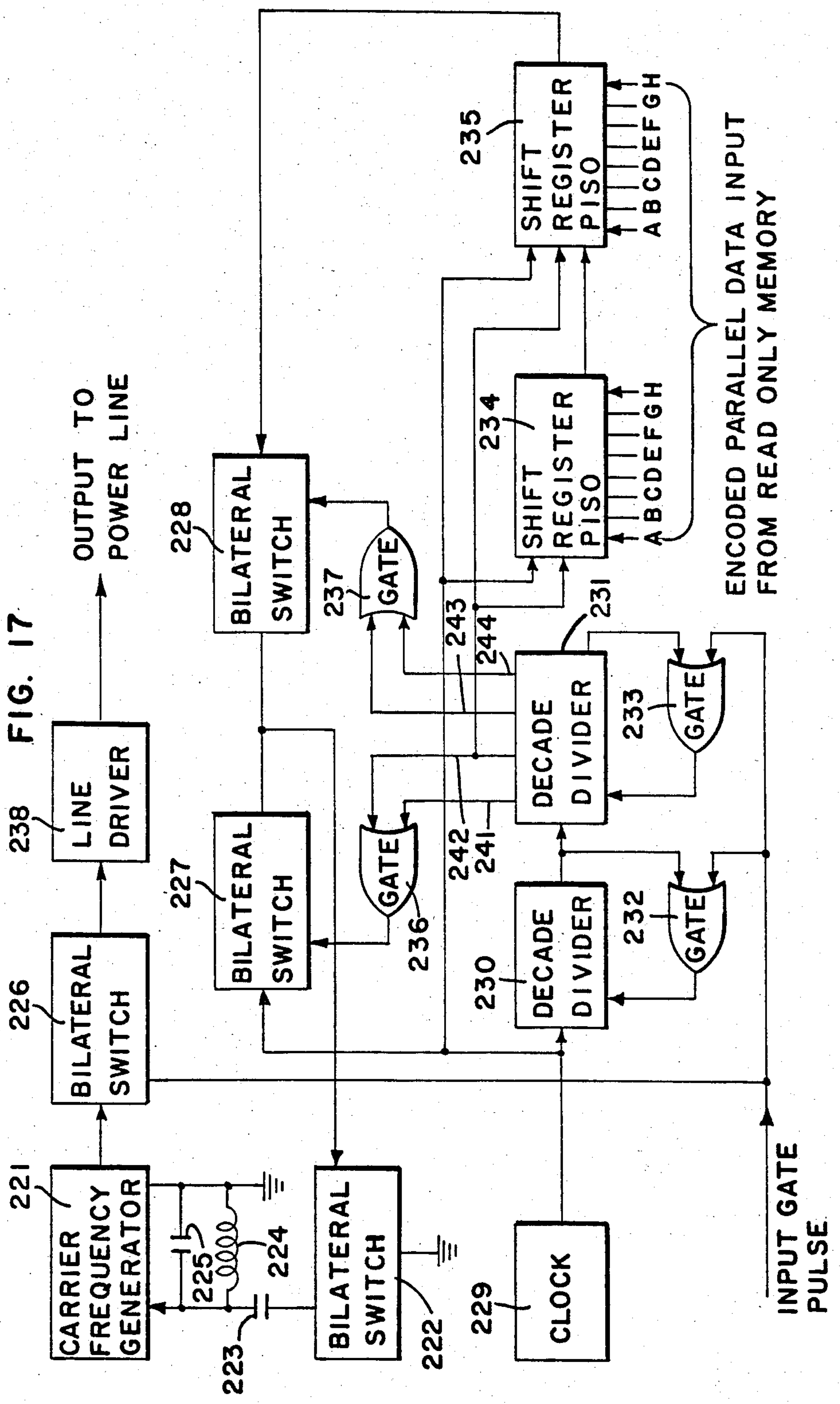
FIG. 17 shows a block diagram of the transmitter, modulator, and digital encoding means of the sender.

A block diagram of a preferred embodiment of the transmitter, modulator and encoder circuitry 216 is shown in FIG. 17. In the embodiment shown in FIG. 17, the transmitting carrier frequency is generated by a carrier frequency generator 221. An inductor 224 and a capacitor 223 determine the operating frequency of frequency generator 221. A capacitor 223 is connected to ground through a bilateral switch 222 so as to effectively frequency modulator generator 221 when bilateral switch 222 is cycled on and off. The difference in carrier frequency between on and off conditions and the modulating frequency (the clock frequency) are kept both within the bounds dictated by a reasonably narrow transmitted frequency spectra for the chosen operating RF band and which, for example, may be below 190K Hz.

The remainder of FIG. 17 shows a preferred embodiment of the encoding portion of circuitry 216 and associated clock frequency generator. Any suitable frequency circuit may be utilized for generating a desired synchronizing signal and for frequency modulating the carrier frequency with data. In the preferred embodiment shown, a clock 229 generates a predetermined frequency output of 640 Hz. Note that the generated frequency may be different for varying applications. The output of clock 229 is connected to the inputs of a decade divider 230, a bilateral switch 227, and shift registers 234 and 235. Decade divider 230 is connected to divide by eight. The output of decade divider 230 is then fed to the input of a decade divider 231 which is connected to divide by six. Note that any combination of decade counters having varying characteristics may be utilized for gating a predetermined number of clock cycles onto the carrier frequency.

Dividers 230 and 231 are reset and commence their counting cycles upon the appearance of the leading edge of an input gate pulse which is fed through gates 232 and 233 to the reset inputs of dividers 230 and 231. The input gate pulse is also fed to a bilateral switch 226. So long as the input gate pulse remains, bilateral switch 226 will allow the FM modulated RF carrier frequency to pass to a line driver 238 which then impresses the carrier frequency onto a power line. Note, this may be on the order of 200 to 300 milliseconds for the illustrative characteristics of the preferred embodiment circuitry being used in this example.

Divider 231 provides four outputs labeled 241, 242, 243 and 244. At the first count, a pulse will appear on output 241. At the second count, output 241 will return to a zero or low level and a pulse will appear on output 242. Likewise, for counts three and four, pulses will successively appear on output 243 and 244. Counts five and six are not outputted because a gap or space is desired between data transmissions as hereinafter explained.

Outputs 241 and 242 from decade divider 231 are fed through an OR gate 236 and thence to a bilateral switch 227. When either output 241 or 242 is high, OR gate 236 will cause bilateral switch 227 to close thus passing the square wave frequency of clock 229 to bilateral switch 222. Bilateral switch 222 will cycle on and off frequency-modulating the carrier frequency at the clock rate. When either output 243 or 244 of decade divider 231 is high, an OR gate 237 to which they are connected will cause a bilateral switch 228 to close. Once bilateral switch 228 is closed, the digital zero and one data from shift registers 234 and 235, which are parallel in/serial out types, will be passed to bilateral switch 222 and generator 221 will again be frequency modulated but now with data instead of clock signal. It should be noted that output 241, 242, 243 and 244 from decade divider 231 occur consecutively not simultaneously.

Shift registers 234 and 235 are clocked by the output of clock 229 and are also connected to output 242 of decade divider 231 so as to load when output 242 falls or goes low. The data loaded will be whatever zero and one data is presented to the parallel inputs of shift registers 234 and 235. This data is received from address and command data word circuitry portion of circuitry 217 shown in FIG. 19.

Figure 18:
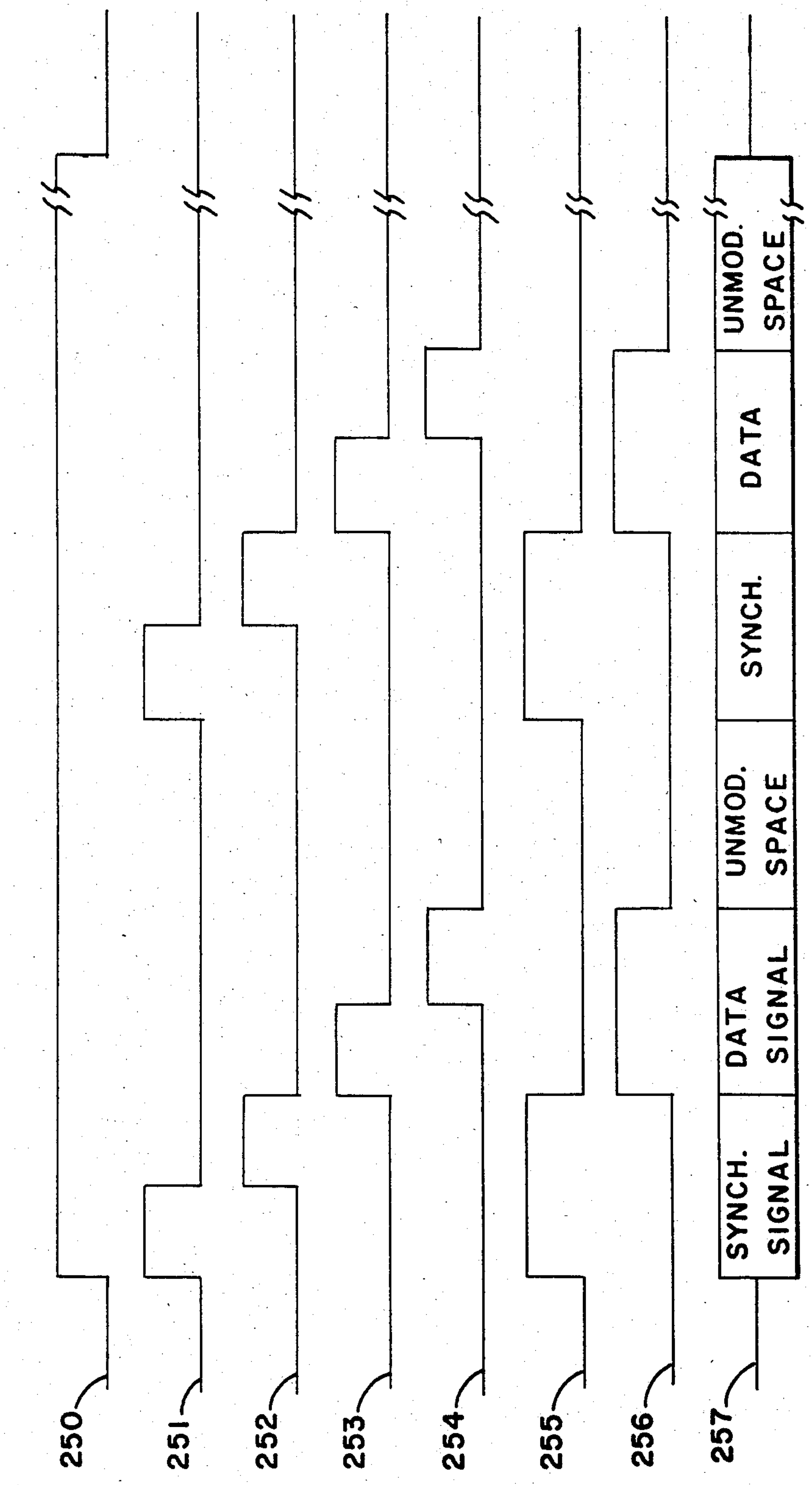
FIG. 18 shows the wave forms present at various points in the sending system and their time relationships.

The timing relationship of various signals involved is shown in FIG. 18. Signal 250 is the input gate pulse which resets dividers 230 and 231 coincident with its leading edge and switches on generator 221. Signal 255 is the output of gate 236 and has the combined duration of signals 251 and 252. In the embodiment shown, this generates 16 cycles of synchronizing signals shown in signal 257 coincident with the pulse on signal 255. Likewise, signal 256 is the output of gate 237 and has the combined duration of signals 253 and 254. Signal 256 closes bilateral switch 228 causing frequency modulation of signal 257 in accordance with the serial data output of shift registers 234 and 235. It should be noted that the signal 257 is on continuously as long as signal 250 is present, even during counts five and six of decade divider 231 where signal 257 is not modulated. This arrangement is important for the proper performance of the receiver, demodulator and squelch circuitry 218.

An examination of the transmitted carrier output signal 257 shows that in the preferred embodiment, carrier frequency output 257 consists of first 16 cycles, of 640 Hz modulation, 16 bits of modulation according to the zero or one data, and an unmodulated space equal in duration to that of either the first two. This signal group is then repeated a number of times. The purpose of the first 16 cycles is to synchronize the receiver clock so that the data can be clocked directly and synchronously into the receiver shift register. This removes the necessitity of the common clock such as the 60 Hz of the power line and enables the data link to function successfully on batteries during power line failure.

Reliability of data transfers is of paramount importance. In order to minimize the chance of data dropout or the generation of a false signal due to, for example, very high interference or high noise, signal 257 is repeated a number of times so as to provide redundance and a form of error correction. The FM modulation employed will allow receiver, demodulator and squelch circuitry 218 to achieve a very large improvement in signal noise ratio as is typical of FM techniques. During periods of non-transmission receiver, demodulator, and squelch circuitry 218 will cut off the passage of noise or interference to the receiver decoder circuitry 219. However, receiver, demodulator and squelch circuitry 218 will recognize a transmission when it occurs and accept this signal for processing.

Careful choice of the configuration of the transmitted signal group can greatly improve the ability of receiver, demodulator and squelch circuitry 218 to discriminate between interference and noise and the desired signal. Various combinations of regular signal amplitude and time patterns together with regular repeating periodicity can be designed to provide a set of characteristics very unlike the noise and interference found on power lines or other transmission paths. The 16 cycle synchronizing signal as shown in signals 257 provides a distinctive regular cyclic signal of fixed time duration easy for receiver demodulator and squelch circuitry 218 to detect. In addition, the repeated transmission of the signal group with a fixed known gap between groups is also a distinctive identifier further reinforcing the identification.

The numbers cited in the preferred embodiment of data link may readily be changed to fit other applications. Thus, for example, the number of synchronizing cycles, the number of data bits and the length of space between signals can be readily altered as well as their timed position.

Figure 19:
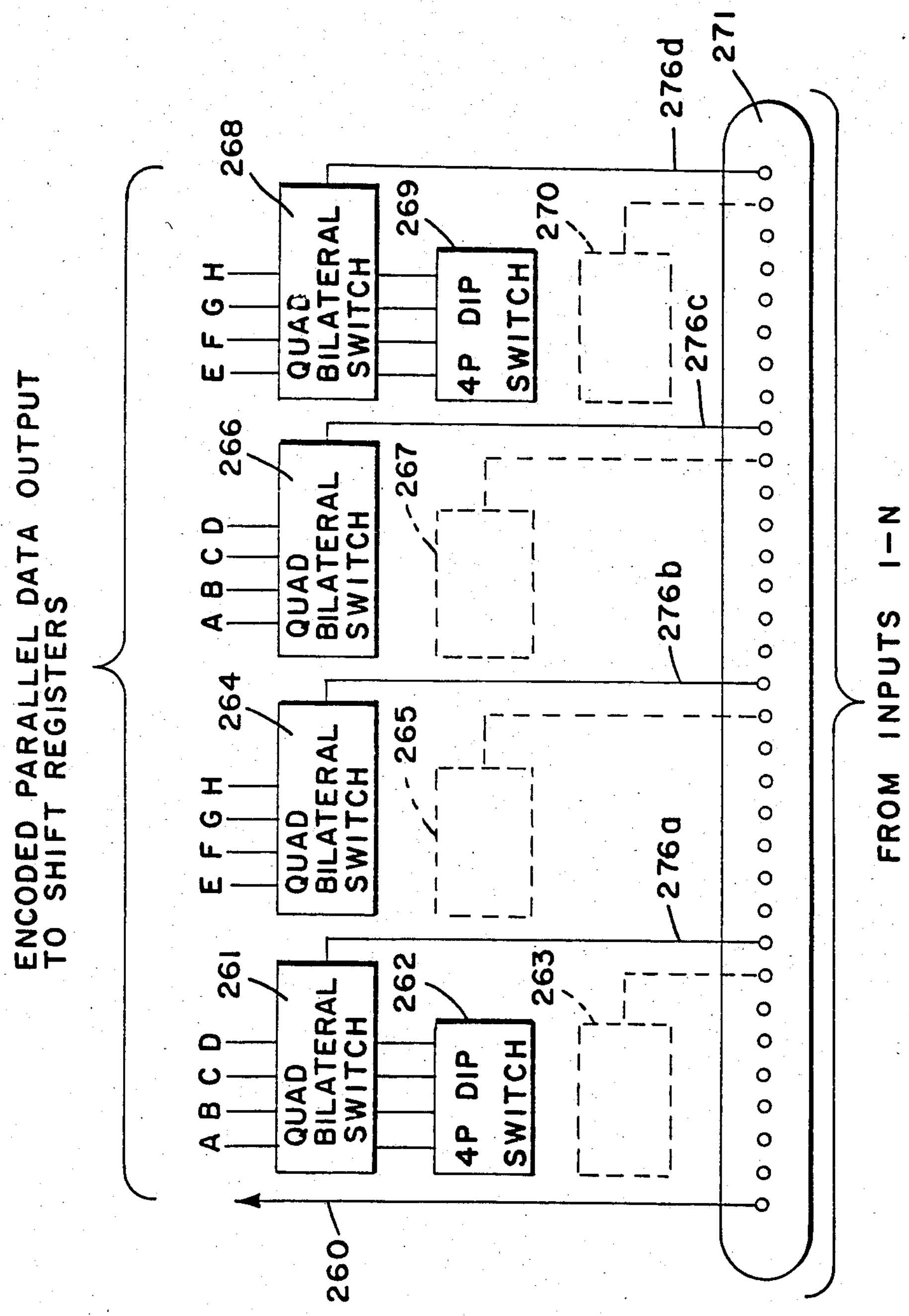
FIG. 19 shows a block diagram of a circuitry for generating the digital word required for various addresses and commands.

A preferred embodiment of the source of the parallel data input (labeled A through H) for shift registers 234 and 235 and the input gate pulse is shown in FIG. 19. The data sources shown may be dedicated to several purposes such as address codes, command codes, etc., or the data might originate from another source to be delivered to a specific address.

In the preferred embodiment shown, quad bilateral switch 261 and four pole DIP switch 262 provide a form of read-only memory which can be switched to any of 16 digital values using binary coding. In the case where a data link sender 211 has only one data source input, the complete address word can be programmed using DIP switches. This would provide the flexibility of being able to designate the data link senders 211 with any address desired.

Where data link sender 211 may have a large number of data source inputs, then it must be able to quickly determine the destination of each of the data inputs, for example to an alarm vs. a telephone dialing device. FIG. 19 illustrates one method of providing a quick address lookup. If, as in the embodiment shown, an eight bit address is desired then quad bilateral switch 261 and DIP switch 262 can provide the first four bits and quad bilateral switch 264 can provide the remaining four bits. In this case, the inputs of quad bilateral switch 264 would be wired one and zero for one of 16 addresses. As generally indicated by block 265, fifteen additional quad bilateral switches could be provided and wired to complete a word table having sixteen four-bit words contained therein. Combining this table with another, for example those from quad bilateral switch 261 and DIP switch 262, will provide sixteen eight-bit addresses. The address available can be doubled to thirty two if a second quad bilateral switch and four pole DIP switch is employed as generally indicated by 263. In the embodiment shown, full expansion will provide two hundred and fifty six different addresses. Of course, more addresses may be easily provided for.

In addition, command words can be provided for by duplicating the circuitry just described. Quad bilateral switch 266 and the fifteen quad bilateral switches generally indicated by 267 can again be connected for a table of sixteen four bit words. Each word can provide commands for use by the data link. A quad bilateral switch 268 and DIP switch 269 can provide a selectable four bit word to be used separately or with the four bits of quad bilateral switches 266, 267 for an expanded command word. Block 270 generally represents one or more additional switch selectable words. Line 260 represents the input gate pulse which activates transmitter, modulator and encoder circuitry 216 of data sender 211. The digital word lengths and usages may be changed to suit other applications.

Figure 20:
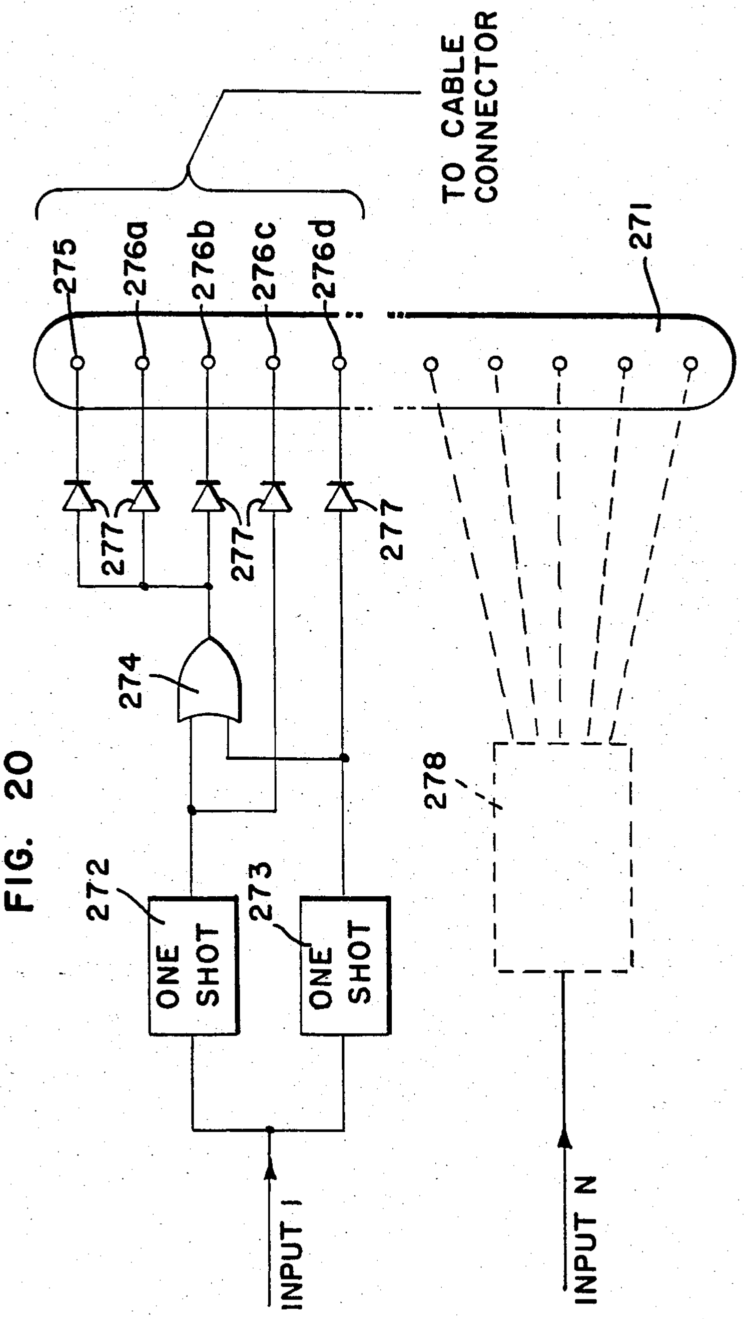
FIG. 20 shows a block diagram of a circuitry for determining the selection of particular digital words.

In the preferred embodiment shown, when a transmission is to be made, data link sender 211 is provided with an input gate pulse via lead 260 and four 4-bit digital words from memory. The controls that determine word selection arrive through cable connector 271 and originate from word selection circuitry, a preferred embodiment of which is shown in FIG. 20. Inputs 1 through N illustrated in FIG. 20 may remain on for several minutes. Each input may represent a particular command which is to be addressed to a particular destination. Additionally, a leading edge of an input pulse may initiate the command and the trailing edge of an input pulse may terminate the command.

One shot 272 is connected to trigger on the leading edge of the input pulse and one shot 273 is connected to trigger on the trailing edge of the input pulse. OR gate 274 provides an output whenever one shot 272 or 273 triggers. Outputs 275 and 276 from one shot 272, 273 are provided through diodes 277 which prevent interaction from other outputs. Additional circuitry for each input is generally indicated by block 278. Outputs 275 and 276 are routed through cable connector 271 as shown. Output 275 provides the gate pulse sent via lead 260 to initiate sender transmission modulation and encoding. The length of the transmission is determined by one shots 272 and 273 and may be on the order of 300 milliseconds. Outputs 276 are suitably connected via cable connector 271 so as to cause the transmission of the appropriate 4-bit digital words from the address and command word generation circuitry. The actual number of digital words and their bit length may vary depending on the application.

Figure 21:
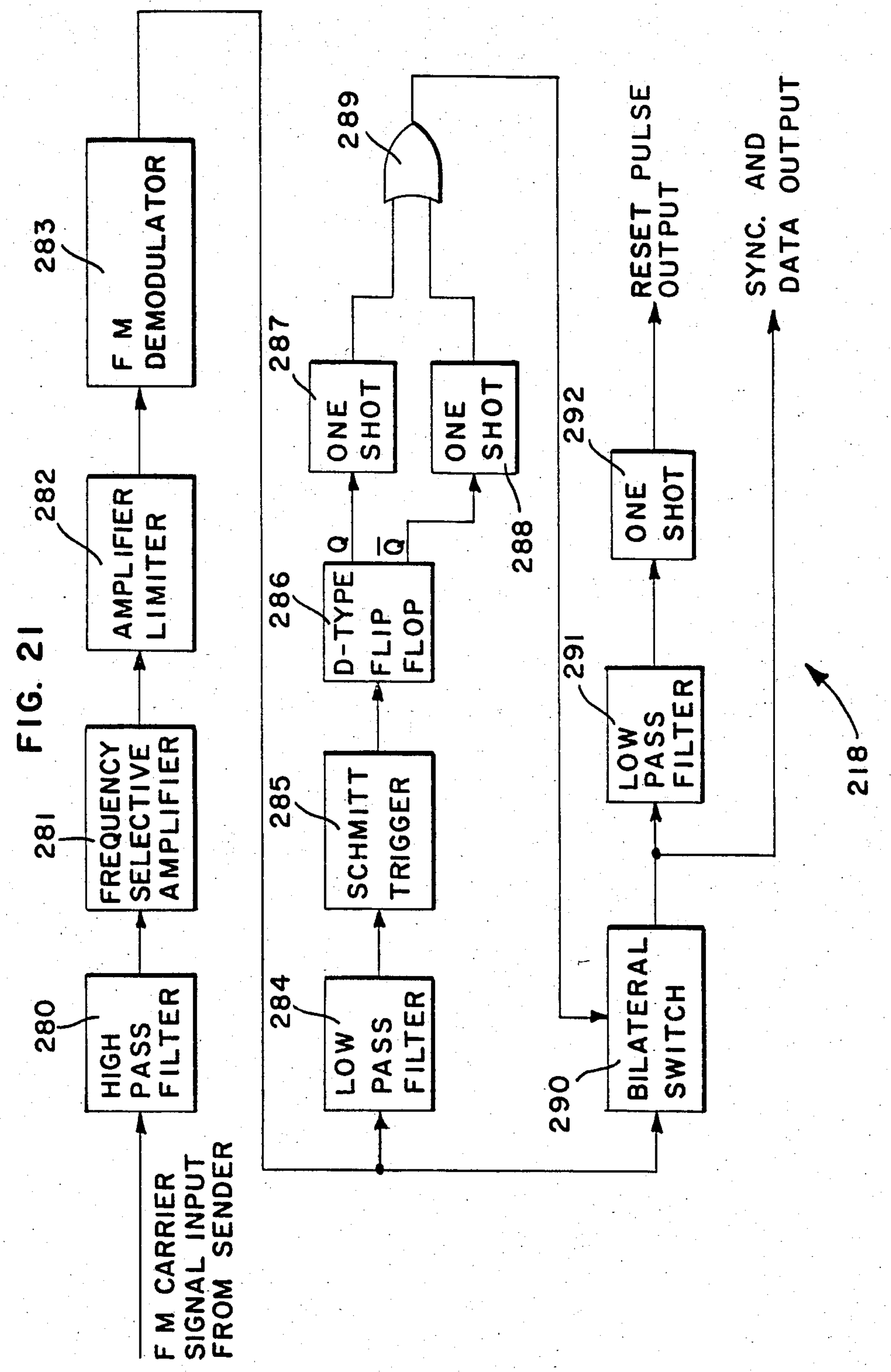
FIG. 21 shows a block diagram of the frequency selective, FM demodulation, and squelch portion of the receiving means.

FIG. 21 shows a preferred embodiment of receiver, demodulator, and squelch circuitry 218 of data link receiver 212. Suitable circuitry may be utilized for frequency selection and demoduation. In the preferred embodiment shown, a high pass filter 280 is designed to pass the RF carrier signal appearing on the power line with little attenuation while greatly attenuating the 60 hertz frequency of the power line. The purpose of a frequency selective amplifier 281 is to pass only a selected narrow band of frequencies just sufficiently wide to admit the modulated carrier and its side bands. All other frequencies including those of close adjacent channels are greatly attenuated. This results in rejection of a large part of the noise and interference in this RF band. The signal is next amplified and limited in an amplifier limiter 282 and then is demodulated in an FM demodulator 283. Sufficient gain is provided by frequency selective amplifier 281 and amplifier limiter 282 to ensure limiting action in amplifier limiter 282 even though the input signal might vary up to or over 40 decibels.

Figure 22:
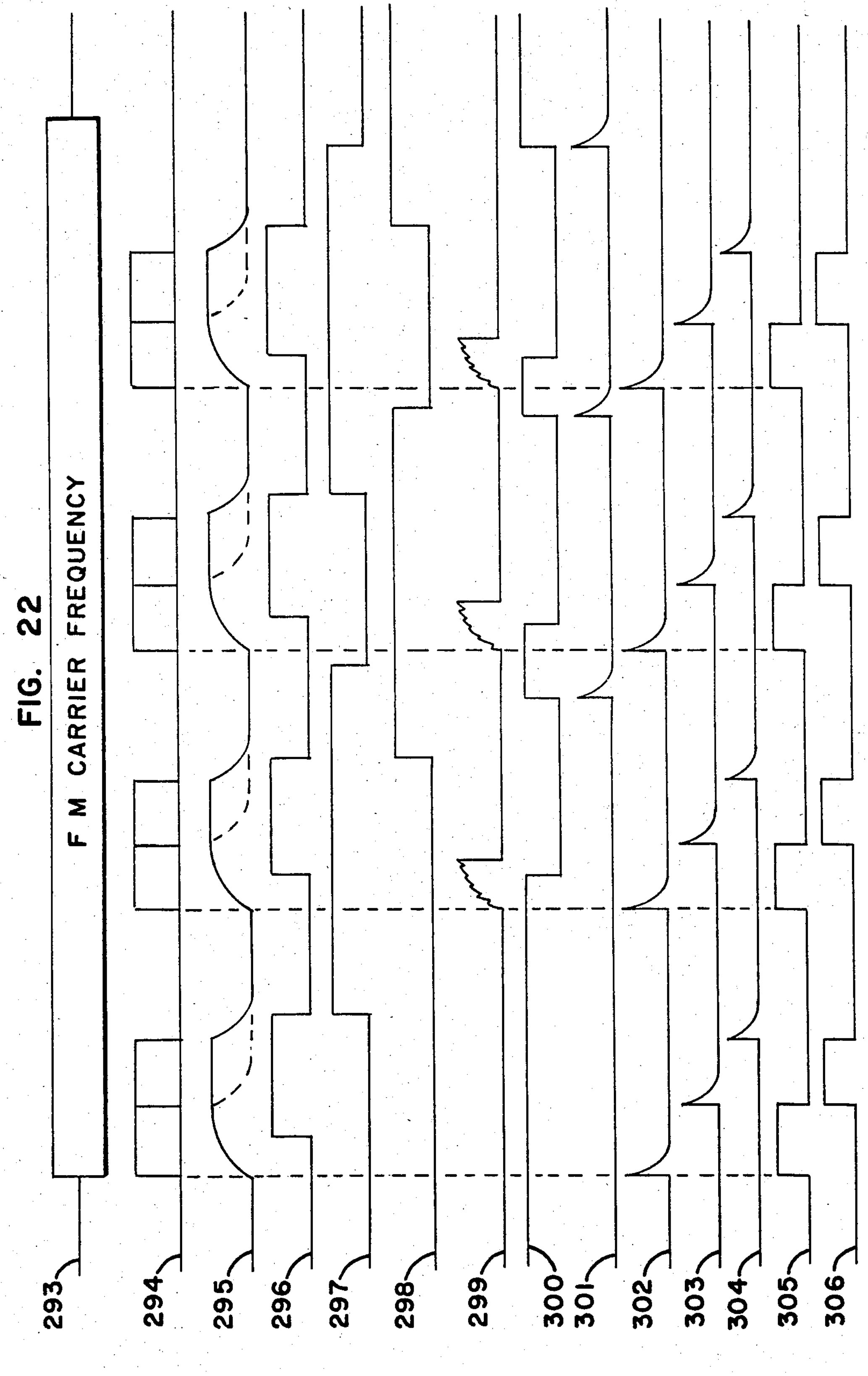
FIG. 22 shows the signal wave form appearing at various points in the receiver device and their time relationship.

After demodulation, the signal is next fed to the squelch circuitry portion of receiver 212. The waveform of the demodulated signal is shown in FIG. 22 as line 294. Line 293 represents the modulated carrier frequency. In the example carrier frequency illustrated, the first section consists of fifty percent duty factor synchronizing cycles, the second section consists of data bits with a random duty factor, and a third section has no signal.

The demodulated signal enters low pass filter 284. Because the demodulated signal is uni-polar and because of the choice of filter cutoff frequency, the filter output will reach essentially full amplitude at the termination of the synchronizing portion of the demodulated signal. At the end of the data portion of the signal or if there is no data at the end of the synchronizing signal, the filter output will decay to zero as shown by signal 295 in FIG. 22. Repeating of the composite input signal shown on line 293 and line 294 will result in duplicate or repeating filter output signals as line 295 indicates.

The signal is next transmitted to a Schmitt trigger circuit 285. Line 296 shows the output from Schmitt trigger circuit 285. In the preferred embodiment, Schmitt trigger circuit 285 triggers when waveform 295 reaches about 70 percent of full amplitude and again when this waveform decays to 30 percent of full amplitude as shown in waveform 296. Even with extremely high noise levels this is the result obtained when the carrier signal is present. In the absence of a carrier signal, the noise signals will feed through from the FM demodulator and the squelch circuitry must be relied on to block the noise. Most power line noise has a lower pulse rate frequency and duty factor than the frequency and duty factor of the synchronizing signal. In the preferred embodiment this is 640 Hz and a 50% duty factor. The result is that when no carrier frequency is present, the output from low pass filter 284 will not reach the trigger level of Schmitt trigger 285.

Howevever, the noise produced by a series wound comutator motor is an exception because the brushes and commutator break the electrical circuit many times per revolution producing a high pulse rate frequency output which may equal or exceed 640 Hz. This large amplitude, high pulse rate frequency noise will cause the output of low pass filter 284 to rise above the trigger level of schmitt trigger 285. However, it will remain high until the series motor is shut down and will not have the cyclic pattern of the signal on wave form 294 and neither will the output of Schmitt trigger 285. This key difference from desired signal response is used to block noise passage to receivers 212.

The output of Schmitt trigger 285 is connected to the input of a flip flop 286 which toggles on the negative pulse edge from Schmitt trigger 285. As flip flop 286 toggles, a one shot 287 will trigger and then a one shot 288 will trigger. The output of one shot 287 is shown by waveform 297 in FIG. 22. One shot 287 is timed to recover in the following dead space. Before one shot 287 recovers, one shot 288 will trigger as waveform 298 illustrates and likewise will recover in the following dead space. Two one shots are needed to ensure continuous signal output from bilateral switch 290. The outputs of one shots 287 and 288 are fed to an OR gate 289 whereupon an output is fed to bilateral switch 290. This output will close bilateral switch 290 hence allowing demodulated synchronous and data signal to pass to synchronization and decoding circuitry 219 of receiver 212. In the absence of the signal carrier frequency, noise will be unable to cycle schmitt trigger 285 and bilateral switch 290 will remain open blocking passage of noise to receiver 212.

A further impediment is placed in the noise path by low pass filter 291 and a one shot 292. When a desired signal is passing through bilateral switch 290, the output of low pass filter 291 will appear as illustrated by waveform 299 in FIG. 22. Buildup of synchronous signal in low pass filter 291 will cause it to trigger when the signal reaches about 70 percent of maximum. One shot 292 is connected to then reset low pass filter 291 to zero level. One shot 292 is connected to recover in the following space as indicated by waveform 300. The recovery pulse edge is used as a reset pulse, shown by waveform 301 to ready the receiver clock, synchronizing and decoding circuitry 219 to operate on the next signal group.

To return to the earlier reference of a series motor, Schmitt trigger 285 will not cycle but remain in a trigger position as long as the motor runs continuously, thereby noise will be cut off from decoder circuitry 219. However, when the motor is shut down, Schmitt trigger 285 will recover, triggering flip flop 286 and closing bilateral switch 290 until one shot 287 or 288 recovers. Any other noise present in the demodulator output will for the recovery period of one shots 287, 288 pass to the receiver decoder circuitry 219. But as explained previously, receiver 212 has not yet been reset and readied for the reception of data signal and thus nothing will occur.

About the only noise that is capable of passing through low pass filter 291 and low pass filter 284 in sufficiently large amplitude to trigger synchronization and decoder circuitry 219 is series motor noise. If low pass filter 291 were triggered by series motor noise, the receiver would not be reset until about the time one shot 287 and 288 had recovered opening bilateral switch 290 which cuts off noise to both low pass filter 291, one shot 292 and receiver decoder circuitry 219. This circuitry will also block short and very large bursts of noise as well as continuous noise.

Figure 23:
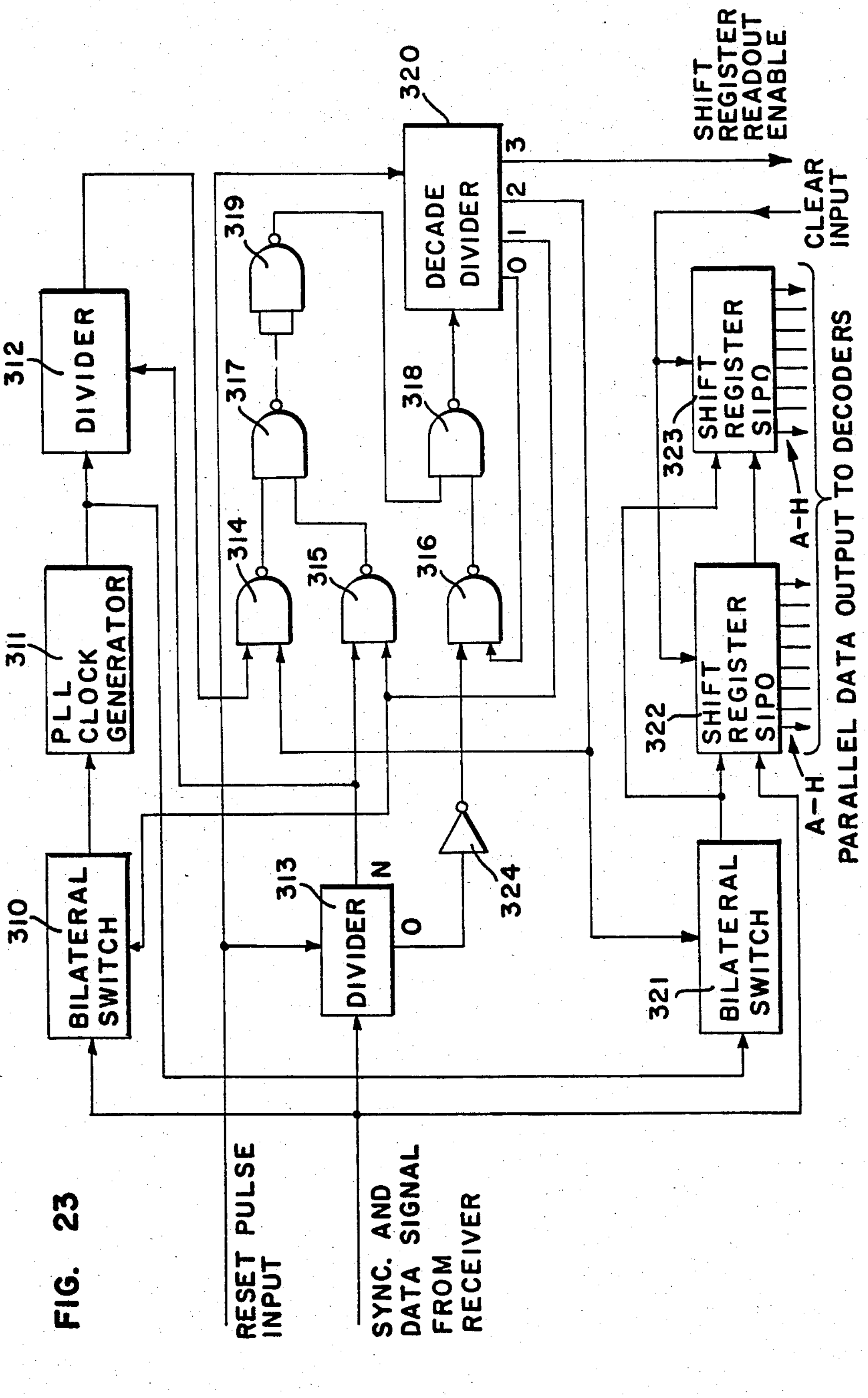
FIG. 23 shows a block diagram of the clock synchronizing and shift register synchronizing circuitry of the receiver.

FIG. 23 shows a preferred embodiment of the clock synchronization and shift register portion of synchronization and decoder circuitry 219 of receiver 212. The purpose of this circuitry is to synchronize the phase lock loop (PLL) of clock generator 311 with the received synchronous clock signals. At termination of the synchronous clock signal, clock generator 311 remains at the clock frequency for the duration of the following data bit period. A further purpose coincident with the arrival of the data bits is to use the synchronous clock signal to step the data bits into shift registers 322 and 323. Bilateral switch 310 is timed to close only during the time the synchronous portion of the incoming signal is present. At other times it is open and data and other non-sync signals will then be rejected. Thus the clock frequency established by clock generator 311 during the synchronous signal period is not altered. It is important that clock generator 311 remain at the correct clock frequency for a short period of time after the received synchronous signal has ended, for it is at this time that the data bits arrive and must be synchronously clocked into serial input/parallel output (SIPO) shift registers 322 and 323. Loop time constant of clock generator 311 is large thereby insuring negligible drift in clock frequency during non-synchronizing periods. It should be noted that while a preferred embodiment is disclosed, any suitable receiver frequency source which is capable of being synchronized with the synchronous signal from sender 211 and which is capable of retaining the synchronous signal's frequency may be utilized.

Suitable circuitry is utilized to synchronously load shift registers with data. In the preferred embodiment, bilateral switch 321 is timed to close only when incoming data is present and to open during synchronizing and space periods. Thus, all non data signals are excluded from shift registers 322 and 323 because of the absence of a clocking signal. Divider 313, divider 312, AND gates 314 through 319, and divider 320 turn bilateral switch 310 and bilateral switch 321 on and off at the desired time in synchronism with the incoming synchronous and data signal groups which are shown in signal 294 of FIG. 22.

A reset pulse shown on line 301 of FIG. 22 from one shot 292 resets divider 313 and 320 to zero count. When a signal group arrives, divider 313 will commence counting the synchronous cycles and output a pulse via inverter 324 when the count leaves zero which marks the start of the synchronous signal as shown on line 302 of FIG. 22. Divider 313 will next provide an output which coincides with the end of the synchronous signal section and the beginning of the data section of the signal group. In the preferred embodiment, there are 16 synchronous cycles, so this event will occur at count 16.

This output is shown on line 303 of FIG. 22. The zero output pulse is fed to NAND gate 316. The second input into gate 316 comes from the zero count output of decade divider 320 which provides outputs at counts zero, one, two and three as indicated in FIG. 23. When both dividers 313 and 320 provide a pulse input, gate 316 will go low and divider 320 will be stepped one count. A pulse now appears on the output labeled one of divider 320. The output labeled one is connected to the input of NAND gate 315 and to bilateral switch 310. This pulse, shown on line 305 in FIG. 22 is coincident with the 16 cycle synchronous part of the signal group and will close bilateral switch 310 so as to synchronize clock generator 311.

The 16 count output of divider 313 is fed to the second input of gate 315 and to the reset input of divider 312. The output of gate 315 will go low and NAND gates 317, 319 and 318, which act as OR gates will step divider 320 one count. The output labeled two of divider 320 then provides a pulse that is connected to one input of NAND gate 314 and to switch 321. At this point, bilateral switch 310 opens isolating clock generator 311 from any further input. Generator 311 will hold the frequency to which it has just been synchronized. In addition, bilateral switch 321 will close feeding the clock signal to the shift registers 322 and 323 in time coincidence with the arriving of the data bits. This switch pulse is shown on line 306 of FIG. 22.

Once divider 312 is reset via the pulse on line 303, it counts sixteen cycles of the clock frequency which marks the termination of the data bit signal part of the signal group. On count sixteen, divider 312 outputs a pulse shown on line 304 of FIG. 22 which is connected to the second input of gate 314. With two logic high input signals, the output of gate 314 will go low, causing divider 320 to step one count, causing an output to appear on the output labeled 3. The output labeled 3 is used as a shift register readout enable. The readout enable signal enables data to be transferred to the decoder portion shown in FIG. 24 only at this time preventing false decoded outputs. When a signal appears on the output labeled 3, decade divider 320 ceases to provide an output to either bilateral switch 310 or bilateral switch 321, causing all action to stop. Nothing further will transpire until divider 313 and divider 320 are reset. At this point, bilateral switch 310 and bilateral switch 321 are open. The data shift registers 322 and 323 cannot be moved. With the input of clock generator 311 cut off, clock generator 311 will remain undisturbed and will essentially remain synchronized.

Nothing will change until a new synchronous and data signal group is received. In the meantime, if the noise somehow slips through the squelch circuitry on the input signal lead, the circuitry will be locked up and nothing will happen.

Figure 24:
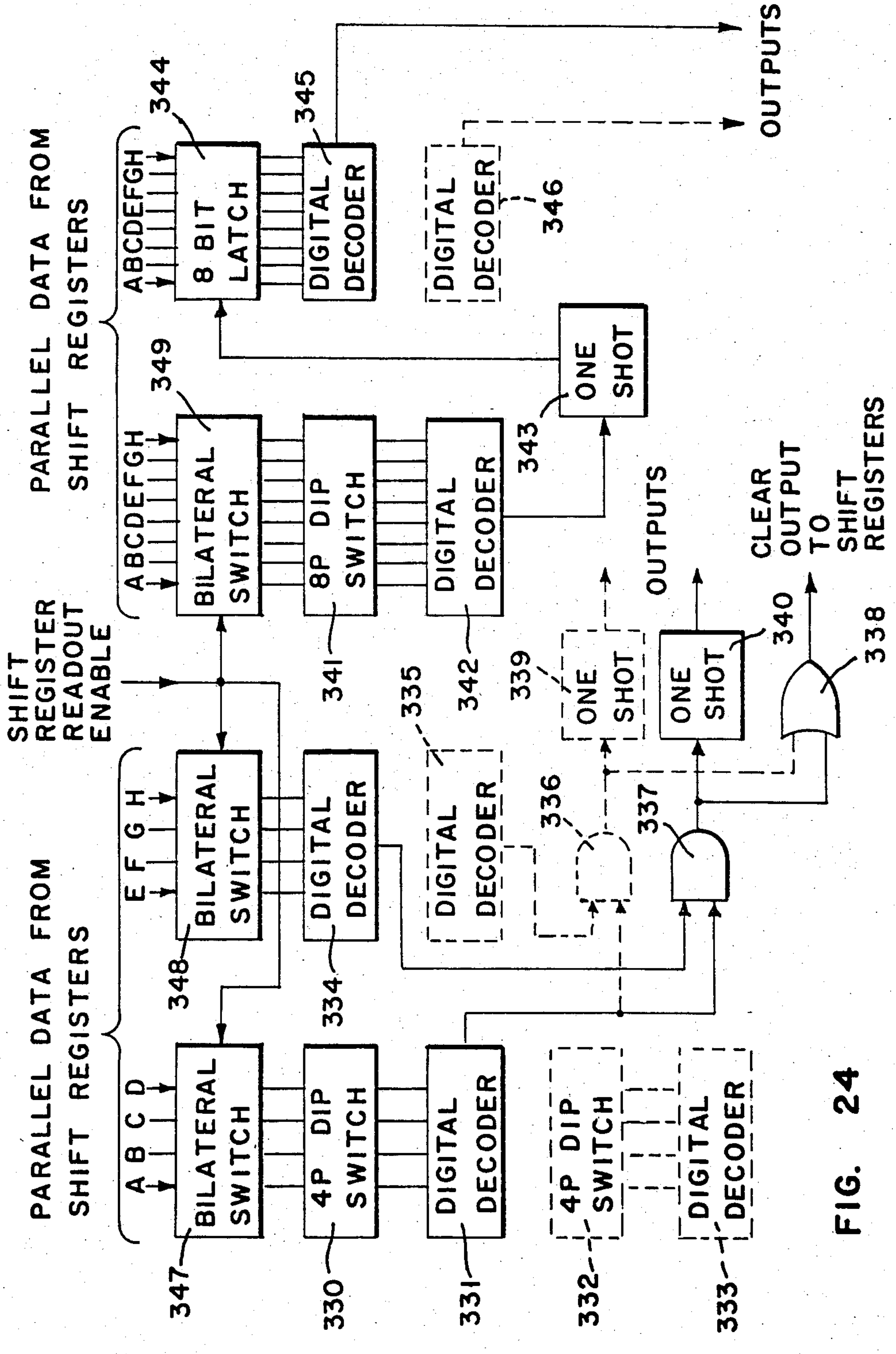
FIG. 24 shows two methods of decoding the digital data.

As illustrated in FIG. 24, the parallel data output illustrated as outputs A through H from shift registers 322 and 323 is connected to quad bilateral switches 347, 348 and 349 and latch 344. The data is then sent to various digital decoders. Shift register readout enable for switches 347, 348 and 349 is obtained from divider 320 in FIG. 23. Data link receiver decoder circuitry can be configured to provide one or many decoded outputs with any desired number of data bits. FIG. 24 shows two possible configurations. In the case where the data link receiver decoder will receive only address data from a number of senders, the decoder circuitry consisting of four pole DIP switches 330 and 332, digital decoders 331 and 333, digital decoders 334 and 335, gates 336, 337 and 338, and one shots 339 and 340 can be used. Note that the dash lines represent several of each particular item.

Using four data bits, 4-pole DIP switch 330 and digital decoder 331 will allow selecting any one of sixteen codes. Another four bits fed to programmable digital decoders 334 and 335 can provide up to sixteen more codes. When combined with AND gates 336 and 337, 256 separate address outputs are accessible. If the DIP switch is set to a given code, sixteen address outputs may be obtained. Adding 332 and 333 would increase this to thirty two for example. One shots 339 and 340 are provided to take advantage of the fact that a synchronous data signal group will be repeated several times by the sender. Thus, if one signal group is not decoded due to interference or noise, it is more than likely that one of the others will be. This increases the likelihood that one shot 339 and 340 will be triggered outputting a signal. When a clear signal is desired for shift register 322 and 323, it may be obtained from OR gate 338.

Where the receiver decoder will receive command data as well as address data, the configuration such as shown in FIG. 24 may be used consisting of an eight pole DIP switch 341, a digital decoder 342, a one shot 343, an eight bit latch 344, digital decoders 345 and 346. Eight data bits may be connected to switch 341 and decoder 342 which will permit selection of any one of 256 addresses. One shot 343 will trigger on any one of the two or more synchronous data signal groups received for decoding thus improving the probability that the signal will get through even at very high noise and interference environments. The output of one shot 343 latches eight command data bits in latch 344. These data bits are decoded in decoders 345 and 346 providing a large number of parallel outputs if desired. These outputs may be used to initiate actions of many kinds such as turning devices on or off, dialing telephone numbers, and etc.

In summary, the comprehensive intruder-environmental hazard detection, control, and action system of the present invention utilizes a plurality of remote sensing devices of various types and catagories to detect predetermined conditions such as the presence of an intruder. This is accomplished with a low false alarm rate and a high detection rate. The sensors may be distributed so as to provide reinforcement or correlation of data to assure as nearly as possible actual and accurate detection of a predetermined condition.

The information is encoded and transmitted from the remote sensors to a central data processing center by a secure reliable data link which does not increase the false alarm rate or result in loss of data. At the central data processing center, programmable circuitry provides a flexible decision making process to take advantage of all the information contained in the incoming data. The present invention enables a particular action or combination of actions to be taken in response to a particular detection or combination or detections. The decision making process may be reprogrammed by the user at anytime during system operation.

Once the decision making process has determined a response or responses to be taken, the secure reliable data link of the present invention enables the encoding and transmission of the response information from the central data processing center to various remotely located action devices. The data link enables this to be accomplished without appreciable loss of data.

Throughout the operation of the system, the user is continuously provided with status information in an easy to interpret format. The user is made aware of current and past detections made and actions taken. In addition, the user can obtain system status from a remote site.

Furthermore, controls are provided such that the user can manually initiate actions or deactivate automatic operation of sensors and action devices at any time during system operations. This provides the user with total and complete control of the system during operation.

While the present invention has been described in a preferred embodiment, it should be understood that numerous modifications and substitutions can be had without departing from the sprit of the invention. For example, the various timings and gating circuits described have been shown in schematic form and numerous components and circuits may be employed in actual practice to perform the indicated logic. Also, the digital signal levels and frequencies represented at various points within the circuits are a matter of choice and can be varied in accordance with the requirements of the actual circuitry utilized. On a broader scale, it is not essential to employ only those conditions sensors shown or described nor is it essential to include all of the sensors illustrated. Accordingly, the present invention has been described in a preferred embodiment by way of illustration rather than limitation. Changes may be made in details, especially in matters within the principle of the present invention, to the full extent indicated by the broad general meaning of the terms in which the appended claims are expressed.

What is claimed is:

1. A secure reliable transmitting and receiving system for the transfer of digital data, comprising:

means for encoding and transmitting a radio frequency carrier via a transmission medium, said transmitting means including:

(i) means for generating a radio frequency carrier;

(ii) means for frequency modulating said radio frequency carrier;

(iii) means for generating a signal having a predetermined number of clock cycles, said modulating means modulating said radio frequency carrier with said clock cycle signal such that said radio frequency carrier includes a first segment of said clock cycle signal;

(iv) means for encoding digital data having a predetermined number of bits of digital data, said modulating means modulating said radio frequency carrier with said digital data such that said radio frequency carrier includes a second segment of said digital data;

(v) means for prohibiting modulation of said radio frequency carrier by said modulating means, such that said radio frequency carrier includes a third segment having unmodulated radio frequency carrier;

(vi) means for repeated modulation of said radio frequency carrier such that said radio frequency carrier includes said first, second and third segments forming a block of information repeated a predetermined number of times, said block of information having a wave form distinct from that of unwanted noise and interference on the transmission medium;

means for receiving and demodulating said radio frequency carrier, said means including:

(i) high pass filter means for filtering out power line 60 Hz on said transmission medium;

(ii) means for amplifying and limiting a narrow band of frequencies centered on said radio frequency carrier; and (iii) means for demodulating said radio frequency carrier to provide a demodulated signal;

circuit means associated with said receiving means for a first stage of discrimination between said block of information and noise and interference, said circuit means including:

(i) first low pass filter means for generating a signal upon receipt of said demodulated signal;

(ii) schmitt trigger circuitry for receiving said signal from said first filter means, said schmitt trigger circuitry generating an output in response to said signal from said first filter means;

(iii) flip flop circuitry for receiving said output from said schmitt trigger circuitry, said flip flop circuitry generating an first alternating output in response to said output of said schmitt trigger circuitry;

(iv) dual one shot circuitry for receiving said alternating output of said flip flop circuitry, said dual one shot circuitry generating second alternating outputs timed to coincide with the immediately following demodulated signal in response to said first alternating outputs of said flip flop circuitry;

(v) OR gate circuitry for receiving said alternating outputs of said dual one shot circuitry, said OR gate generating an output in response to said alternating outputs of said dual one shot circuitry; and (vi) bilateral switch circuitry for receiving said outputs of said OR gate and for receiving said demodulated signal, said bilateral switch circuitry providing a demodulated signal output in response to said outputs of said OR gate circuitry;

means for a second stage of discrimination between said immediately following block of information and noise and interference including:

(i) second low pass filter means for generating a signal output upon receipt of said demodulated signal output from said bilateral switch circuitry; and (ii) one shot circuitry for receiving said signal output from said second filter means, said one shot circuitry generating a decoder reset pulse output in response to said signal output of said second filter means;

means for a third stage of discrimination between said immediately following block of information and noise and interference including:

(i) counting means for receiving said demodulated signal output of said bilateral switch circuitry, said counting means generating a first marker pulse output at the start of said predetermined number of clock cycles, a second marker pulse output at the termination of said predetermined number of clock cycles, and a third marker pulse output at the termination of said predetermined number of digital data bits in response to said demodulated signal output from said bilateral switch circuitry; and (ii) counting and gating means for receiving said marker pulse outputs from said counting means, said counting and gating means outputting signal clock cycles during a time interval marked by said first pulse output at the start of said predetermined number of clock cycles and said second pulse output at the termination of said predetermined number of clock cycles, said counting and gating means further outputting said digital data bits during a time interval marked by said second pulse output at the termination of said predetermined number of clock cycles and said third pulse output at the termination of the predetermined number of digital data bits, said counting and gating means further generating and outputting a shift register readout enable signal timed to immediately follow said third marker pulse in response to said third marker pulse output of said counting means, said counting and gating means further including means for receiving said decoder reset pulse output from said one shot circuitry, said counting and gating means outputting said clock cycles, said digital data bits, and said shift register readout enable signal, in response to said decoder reset pulse output of said one shot circuitry, and said counting and gating means in the absence of said decoder reset pulse output and in the absence of said clock cycles and said digital data bits blocking all output including noise and interference outputs;

receiving means for processing said gated digital data, said receiving means including:

(i) a phase locked loop frequency generator means for generating a synchronizing signal synchronous with said gated clock cycles; and (ii) shift register means for inputting said gated digital data serially and outputting said digital data parallelly, said synchronizing signal synchronizing the inputting of said gated digital data into said shift register means; and means for decoding said digital data, said decoding means receiving said parallel data from said shift register means.

2. A secure reliable transmitting and receiving system in accordance with claim 1, wherein said decoding means includes:

(i) bilateral switch circuitry for receiving said parallel digital data output of said shift register means and for receiving said shift register readout enable signal of said counting and gating means, said bilateral switch circuitry providing a switched parallel digital data output of short duration immediately following the time said shift register means is fully loaded with said digital data, in response to said shift register readout enable signal of said counting and gating means;

(ii) preselectable digital data decoding means for receiving said parallel digital data output of said bilateral switch circuitry, said preselectable digital decoding means providing a signal output only when said digital data matches a preselected code of said preselectable digital decoding means; and (iii) one shot circuitry for receiving said signal output of said preselectable digital decoding means, said one shot circuitry generating the signal output in response to said signal output of said preselectable digital decoding means.

3. A secure reliable transmitting and receiving system for the transfer of digital data, comprising:

means for encoding a block of information, said block of information having a predetermined number of clock cycles, a predetermined number of bits of digital data, and a predetermined unmodulated time gap all repeated a preselected number of times, said block of information having a waveform distinct from that of noise and interference;

means for generating a radio frequency carrier;

means connected with said radio frequency carrier means for modulation of said radio frequency carrier with said block of information;

receiving means for receiving and demodulating said block of information;

circuit means associated with said receiving means for transmitting said block of information and rejecting noise and interference, said circuit means including:

(i) first low pass filter and high and low level schmitt trigger circuitry for providing a first stage of discrimination between said block of information and noise and interference in random bursts or in continuous form;

(ii) gating circuitry associated with said filter and trigger circuitry for transmitting the block of information immediately following said block of information to additional signal processing circuitry and for blocking transmission of noise and interference;

(iii) second low pass filter and one shot trigger circuitry for providing a second stage of discrimination between said immediately following block of information and noise and interference and for providing an output decoder reset pulse when the signal received by said second low pass filter and one shot trigger circuitry is said immediately following block of information and for providing no output decoder reset pulse when noise or interference is received by said filter and one-shot trigger circuitry;

(iv) divider, gating, phase locked loop clock generator, shift register and decoding circuitry for providing a third stage of discrimination between transmitted said immediately following block of information and noise and interference, said third stage of discrimination beginning only on receipt of said output decoder reset pulse signaling receipt by said second state of discrimination of said immediately following block of information rather than receipt of noise or interference, receipt of both said output decoder reset pulse and said immediately following block of information initiating count of said clock cycles and count of said digital data bits where start and termination times of said counts determine precise time periods when said clock cycles may be admitted to the phase lock loop for synchronization of said phase lock loop and the shift register and when said digital data bits may be entered into shift register, loading of said shift register terminates said counts thereby initiating off-loading of said digital data bits in said shift register in parallel to said decoding circuitry, clearing said shift register of all said digital data bits, outputting a readout enable pulse, and locking up all circuit operations of the divider, gating, phase locked loop clock generator, shift register, and decoding circuitry pending reactivation by receipt of additional said output decoder reset pulses.

4. A secure reliable transmitting and receiving system in accordance with claim 3 wherein said decoding circuitry includes:

gated receiving circuitry for receiving said parallel digital output of said shift register and for receiving said readout enable pulse, said gated receiving circuitry providing a gated parallel digital data output of short duration immediately following the time said shift register is fully loaded with said digital data in response to said readout enable pulse;

preselectable digital decoding circuitry for receiving said gated parallel digital data output of said gated receiving circuitry, said preselectable digital decoding circuitry providing a signal output only when said parallel digital data matches a preselected code of said preselectable digital decoding circuitry.

* * * * *

UNITED STATES PATENT AND TRADEMARK OFFICE
CERTIFICATE OF CORRECTION

PATENT NO. : 4,638,496
DATED : January 20, 1987
INVENTOR(S) : Jensen

It is certified that error appears in the above-identified patent and that said Letters Patent is hereby corrected as shown below:

Col. 2, Line 51, "modernity and" should be --monitoring a--.
Col. 2, Line 53, "transporting" should be --transmitting--.
Col. 2, Lines 54 and 60, "mode" should be --remote--.
Col. 2, Lines 61-62, "reprograming" should be --reprogramming--.
Col. 3, Line 35, after "alarm" insert --rate--.
Col. 4, Line 31, "sender. Thereby" should be --sender, thereby--.
Col. 5, Line 25, "of portion" should be --of a portion--.
Col. 5, Line 27, "indicaters" should be --indicators--.
Col. 5, Line 38, "detecter" should be --detector--.
Col. 8, Line 24, delete "action #4".
Col. 10, Line 36, "has" should be --have--.
Col. 10, Line 41, "were" should be --are--.
Col. 11, Line 4, "opeator" should be --operator--.
Col. 11, Line 46, "proviced" should be --provided--.
Col. 12, Line 54, "seconds" should be --second--.
Col. 13, Line 24, "converters" should be --converters'--.
Col. 14, Line 52, after "of" insert --the--.
Col. 15, Line 13, "than" should be --then--.
Col. 15, Line 54, after "counter" insert --112--.
Col. 15, Line 61, "and" should be --any--.
Col. 18, Line 44, "extnded" should be --extended--.
Col. 19, Line 3, "ouptut" should be --output--.
Col. 22, Line 31, "necessitity" should be --necessity--.
Col. 24, Line 25, "demoduation" should be --demodulation--.
Col. 25, Line 13, "Howevever" should be --However--.
Col. 25, Line 14, "comutator" should be --commutator--.
Col. 28, Line 61, after "combination" delete "or" and insert --of--.
Col. 30, Line 24, "an" should be --a--.

UNITED STATES PATENT AND TRADEMARK OFFICE

CERTIFICATE OF CORRECTION

PATENT NO. : 4,638,496

DATED : January 20, 1987

INVENTOR(S) : Jensen

It is certified that error appears in the above-identified patent and that said Letters Patent is hereby corrected as shown below:

Col. 32, Line 51, "state" should be --stage--.

Signed and Sealed this

Eighth Day of August, 1989

Attest:

DONALD J. QUIGG

Attesting Officer

Commissioner of Patents and Trademarks